(12) United States Patent
Horowitz et al.

(10) Patent No.: US 7,885,961 B2
(45) Date of Patent: Feb. 8, 2011

(54) ENTERPRISE CONTROL AND MONITORING SYSTEM AND METHOD

(75) Inventors: Stephen A. Horowitz, Acworth, GA (US); Bridget Strawser, Woodstock, GA (US); E. Todd Clark, Kennesaw, GA (US); Alain Azurmendi, Marietta, GA (US)

(73) Assignee: Computer Process Controls, Inc., Kennesaw, GA (US)

( * ) Notice: Subject to any disclaimer, the term of this patent is extended or adjusted under 35 U.S.C. 154(b) by 919 days.

(21) Appl. No.: 11/394,380

(22) Filed: Mar. 30, 2006

(65) Prior Publication Data

US 2006/0242200 A1 Oct. 26, 2006

Related U.S. Application Data

(63) Continuation of application No. PCT/US2006/005917, filed on Feb. 21, 2006.

(60) Provisional application No. 60/654,719, filed on Feb. 21, 2005.

(51) Int. Cl.
*G06F 17/30* (2006.01)
(52) U.S. Cl. .................................. 707/737; 707/796
(58) Field of Classification Search .................. 707/5–7, 707/102
See application file for complete search history.

(56) References Cited

U.S. PATENT DOCUMENTS

| | | | |
|---|---|---|---|
| 2,296,822 A | 9/1942 | Wolfert | |
| 3,232,519 A | 2/1966 | Long | |
| 3,513,662 A | 5/1970 | Golber | |
| 3,585,451 A | 6/1971 | Day | |
| 3,653,783 A | 4/1972 | Sauder | |
| 3,735,377 A | 5/1973 | Kaufman | |
| 3,767,328 A | 10/1973 | Ladusaw | |
| 3,783,681 A | 1/1974 | Hirt et al. | |
| 3,924,972 A | 12/1975 | Szymaszek | |
| 4,060,716 A | 11/1977 | Pekrul et al. | |
| 4,090,248 A | 5/1978 | Swanson et al. | |
| 4,102,150 A | 7/1978 | Kountz | |

(Continued)

FOREIGN PATENT DOCUMENTS

CH 173493 11/1934

(Continued)

OTHER PUBLICATIONS

European Search Report for EP 01 30 1752; Mar. 26, 2002; 4 Pages.

(Continued)

*Primary Examiner*—Debbie Le
(74) *Attorney, Agent, or Firm*—Harness, Dickey & Pierce, P.L.C.

(57) ABSTRACT

A method comprises grouping a plurality of building system controllers into at least one control system group, the at least one control system group corresponding to at least one connected group of building system controllers. The method also comprises grouping the at least one control system group into at least one site group, the at least one site group corresponding to a physical location of the at least one control system group. The method also comprises selecting a group from the at least one site group and the at least one control system group, and performing an activity on each controller within the selected group.

16 Claims, 33 Drawing Sheets

U.S. PATENT DOCUMENTS

| | | |
|---|---|---|
| 4,102,394 A | 7/1978 | Botts |
| 4,112,703 A | 9/1978 | Kountz |
| 4,132,086 A | 1/1979 | Kountz |
| 4,151,725 A | 5/1979 | Kountz et al. |
| 4,281,358 A | 7/1981 | Plouffe et al. |
| 4,308,725 A | 1/1982 | Chiyoda |
| 4,325,223 A | 4/1982 | Cantley |
| 4,345,162 A | 8/1982 | Hammer et al. |
| 4,372,119 A | 2/1983 | Gillbrand et al. |
| 4,384,462 A | 5/1983 | Overman et al. |
| 4,390,321 A | 6/1983 | Langlois et al. |
| 4,390,922 A | 6/1983 | Pelliccia |
| 4,399,548 A | 8/1983 | Castleberry |
| 4,420,947 A | 12/1983 | Yoshino |
| 4,425,010 A | 1/1984 | Bryant et al. |
| 4,429,578 A | 2/1984 | Darrel et al. |
| 4,434,390 A | 2/1984 | Elms |
| 4,463,576 A | 8/1984 | Burnett et al. |
| 4,467,613 A | 8/1984 | Behr et al. |
| 4,470,092 A | 9/1984 | Lombardi |
| 4,479,389 A | 10/1984 | Anderson, III et al. |
| 4,494,383 A | 1/1985 | Nagatomo et al. |
| 4,497,031 A | 1/1985 | Froehling et al. |
| 4,502,842 A | 3/1985 | Currier et al. |
| 4,502,843 A | 3/1985 | Martin |
| 4,505,125 A | 3/1985 | Baglione |
| 4,506,518 A | 3/1985 | Yoshikawa et al. |
| 4,510,576 A | 4/1985 | MacArthur et al. |
| 4,520,674 A | 6/1985 | Canada et al. |
| 4,540,040 A | 9/1985 | Fukumoto et al. |
| 4,555,910 A | 12/1985 | Sturges |
| 4,563,878 A | 1/1986 | Baglione |
| 4,575,318 A | 3/1986 | Blain |
| 4,580,947 A | 4/1986 | Shibata et al. |
| 4,604,036 A | 8/1986 | Sutou et al. |
| 4,611,470 A | 9/1986 | Enstrom |
| 4,614,089 A | 9/1986 | Dorsey |
| 4,630,670 A | 12/1986 | Wellman et al. |
| 4,653,280 A | 3/1987 | Hansen et al. |
| 4,655,688 A | 4/1987 | Bohn et al. |
| 4,660,386 A | 4/1987 | Hansen et al. |
| 4,715,792 A | 12/1987 | Nishizawa et al. |
| 4,755,957 A | 7/1988 | White et al. |
| 4,768,346 A | 9/1988 | Mathur |
| 4,787,213 A | 11/1988 | Gras et al. |
| 4,796,466 A | 1/1989 | Farmer |
| 4,798,055 A | 1/1989 | Murray et al. |
| 4,831,560 A | 5/1989 | Zaleski |
| 4,831,832 A | 5/1989 | Alsenz |
| 4,838,037 A | 6/1989 | Wood |
| 4,843,575 A | 6/1989 | Crane |
| 4,856,286 A | 8/1989 | Sulfstede et al. |
| 4,877,382 A | 10/1989 | Caillat et al. |
| 4,881,184 A | 11/1989 | Abegg, III et al. |
| 4,882,747 A | 11/1989 | Williams |
| 4,884,412 A | 12/1989 | Sellers et al. |
| 4,885,707 A | 12/1989 | Nichol et al. |
| 4,904,993 A | 2/1990 | Sato |
| 4,909,076 A | 3/1990 | Busch et al. |
| 4,913,625 A | 4/1990 | Gerlowski |
| 4,924,404 A | 5/1990 | Reinke, Jr. |
| 4,928,750 A | 5/1990 | Nurczyk |
| 4,949,550 A | 8/1990 | Hanson |
| 4,964,060 A | 10/1990 | Hartsog |
| 4,974,427 A | 12/1990 | Diab |
| 4,985,857 A | 1/1991 | Bajpai et al. |
| 5,009,074 A | 4/1991 | Goubeaux et al. |
| 5,018,357 A | 5/1991 | Livingstone et al. |
| 5,022,234 A | 6/1991 | Goubeaux et al. |
| 5,051,720 A | 9/1991 | Kittirutsunetorn |
| 5,056,036 A | 10/1991 | Van Bork |
| 5,058,388 A | 10/1991 | Shaw et al. |
| 5,070,468 A | 12/1991 | Niinomi et al. |
| 5,071,065 A | 12/1991 | Aalto et al. |
| 5,073,862 A | 12/1991 | Carlson |
| 5,076,067 A | 12/1991 | Prenger et al. |
| 5,086,385 A | 2/1992 | Launey et al. |
| 5,088,297 A | 2/1992 | Maruyama et al. |
| 5,099,654 A | 3/1992 | Baruschke et al. |
| 5,109,222 A | 4/1992 | Welty |
| 5,109,700 A | 5/1992 | Hicho |
| 5,115,406 A | 5/1992 | Zatezalo et al. |
| 5,115,967 A | 5/1992 | Wedekind |
| 5,119,466 A | 6/1992 | Suzuki |
| 5,131,237 A | 7/1992 | Valbjorn |
| 5,156,539 A | 10/1992 | Anderson et al. |
| 5,181,389 A | 1/1993 | Hanson et al. |
| 5,203,178 A | 4/1993 | Shyu |
| 5,203,179 A | 4/1993 | Powell |
| 5,209,076 A | 5/1993 | Kauffman et al. |
| 5,209,400 A | 5/1993 | Winslow et al. |
| 5,224,835 A | 7/1993 | Oltman |
| 5,226,472 A | 7/1993 | Benevelli et al. |
| 5,228,304 A | 7/1993 | Ryan |
| 5,241,664 A | 8/1993 | Ohba et al. |
| 5,243,827 A | 9/1993 | Hagita et al. |
| 5,265,434 A | 11/1993 | Alsenz |
| 5,279,458 A | 1/1994 | DeWolf et al. |
| 5,282,728 A | 2/1994 | Swain |
| 5,284,026 A | 2/1994 | Powell |
| 5,299,504 A | 4/1994 | Abele |
| 5,303,560 A | 4/1994 | Hanson et al. |
| 5,311,451 A | 5/1994 | Barrett |
| 5,316,448 A | 5/1994 | Ziegler et al. |
| 5,335,507 A | 8/1994 | Powell |
| 5,362,206 A | 11/1994 | Westerman et al. |
| 5,381,692 A | 1/1995 | Winslow et al. |
| 5,415,008 A | 5/1995 | Bessler |
| 5,416,781 A | 5/1995 | Ruiz |
| 5,423,190 A | 6/1995 | Friedland |
| 5,423,192 A | 6/1995 | Young et al. |
| 5,426,952 A | 6/1995 | Bessler |
| 5,431,026 A | 7/1995 | Jaster |
| 5,435,145 A | 7/1995 | Jaster |
| 5,440,890 A | 8/1995 | Bahel et al. |
| 5,440,891 A | 8/1995 | Hindmon, Jr. et al. |
| 5,440,895 A | 8/1995 | Bahel et al. |
| 5,446,677 A | 8/1995 | Jensen et al. |
| 5,450,359 A | 9/1995 | Sharma et al. |
| 5,452,291 A | 9/1995 | Eisenhandler et al. |
| 5,454,229 A | 10/1995 | Hanson et al. |
| 5,457,965 A | 10/1995 | Blair et al. |
| 5,460,006 A | 10/1995 | Torimitsu |
| 5,467,264 A | 11/1995 | Rauch et al. |
| 5,481,481 A | 1/1996 | Frey et al. |
| 5,481,884 A | 1/1996 | Scoccia |
| 5,483,141 A | 1/1996 | Uesugi |
| 5,509,786 A | 4/1996 | Mizutani et al. |
| 5,511,387 A | 4/1996 | Tinsler |
| 5,519,301 A | 5/1996 | Yoshida et al. |
| 5,528,908 A | 6/1996 | Bahel et al. |
| 5,546,756 A | 8/1996 | Ali |
| 5,546,757 A | 8/1996 | Whipple, III |
| 5,548,966 A | 8/1996 | Tinsler |
| 5,555,195 A | 9/1996 | Jensen et al. |
| 5,570,085 A | 10/1996 | Bertsch |
| 5,570,258 A | 10/1996 | Manning |
| 5,572,643 A | 11/1996 | Judson |
| 5,586,445 A | 12/1996 | Bessler |
| 5,596,507 A | 1/1997 | Jones et al. |
| 5,602,749 A | 2/1997 | Vosburgh |
| 5,602,757 A | 2/1997 | Haseley et al. |
| 5,610,339 A | 3/1997 | Haseley et al. |
| 5,630,325 A | 5/1997 | Bahel et al. |

| | | | |
|---|---|---|---|
| 5,641,270 A | 6/1997 | Sgourakes et al. | |
| 5,655,379 A | 8/1997 | Jaster et al. | |
| 5,655,380 A | 8/1997 | Calton | |
| 5,689,963 A | 11/1997 | Bahel et al. | |
| 5,694,010 A | 12/1997 | Oomura et al. | |
| 5,707,210 A | 1/1998 | Ramsey et al. | |
| 5,713,724 A | 2/1998 | Centers et al. | |
| 5,715,704 A | 2/1998 | Cholkeri et al. | |
| 5,724,571 A | 3/1998 | Woods | |
| 5,741,120 A | 4/1998 | Bass et al. | |
| 5,743,109 A | 4/1998 | Schulak | |
| 5,745,114 A | 4/1998 | King et al. | |
| 5,752,385 A | 5/1998 | Nelson | |
| 5,764,509 A | 6/1998 | Gross et al. | |
| 5,867,998 A | 2/1999 | Guertin | |
| 5,875,430 A | 2/1999 | Koether | |
| 5,875,638 A | 3/1999 | Tinsler | |
| 5,900,801 A | 5/1999 | Heagle et al. | |
| 5,904,049 A | 5/1999 | Jaster et al. | |
| 5,924,295 A | 7/1999 | Park | |
| 5,930,773 A | 7/1999 | Crooks et al. | |
| 5,939,974 A | 8/1999 | Heagle et al. | |
| 5,946,922 A | 9/1999 | Viard et al. | |
| 5,947,693 A | 9/1999 | Yang | |
| 5,953,490 A | 9/1999 | Wiklund et al. | |
| 5,956,658 A | 9/1999 | McMahon | |
| 5,975,854 A | 11/1999 | Culp, III et al. | |
| 5,984,645 A | 11/1999 | Cummings | |
| 5,986,571 A * | 11/1999 | Flick | 340/825.72 |
| 6,006,171 A | 12/1999 | Vines et al. | |
| 6,035,661 A | 3/2000 | Sunaga et al. | |
| 6,038,871 A | 3/2000 | Gutierrez et al. | |
| 6,047,557 A | 4/2000 | Pham et al. | |
| 6,052,731 A | 4/2000 | Holdsworth et al. | |
| 6,081,750 A | 6/2000 | Hoffberg et al. | |
| 6,088,659 A | 7/2000 | Kelley et al. | |
| 6,088,688 A | 7/2000 | Crooks et al. | |
| 6,098,893 A | 8/2000 | Berglund et al. | |
| 6,122,603 A | 9/2000 | Budike, Jr. | |
| 6,125,642 A | 10/2000 | Seener et al. | |
| 6,129,527 A | 10/2000 | Donahoe et al. | |
| 6,153,993 A | 11/2000 | Oomura et al. | |
| 6,169,979 B1 | 1/2001 | Johnson | |
| 6,176,686 B1 | 1/2001 | Wallis et al. | |
| 6,178,362 B1 * | 1/2001 | Woolard et al. | 700/295 |
| 6,179,214 B1 | 1/2001 | Key et al. | |
| 6,191,545 B1 | 2/2001 | Kawabata et al. | |
| 6,213,731 B1 | 4/2001 | Doepker et al. | |
| 6,215,405 B1 | 4/2001 | Handley et al. | |
| 6,223,544 B1 | 5/2001 | Seem | |
| 6,240,733 B1 | 6/2001 | Brandon et al. | |
| 6,240,736 B1 | 6/2001 | Fujita et al. | |
| 6,244,061 B1 | 6/2001 | Takagi et al. | |
| 6,266,968 B1 | 7/2001 | Redlich | |
| 6,268,664 B1 | 7/2001 | Rolls et al. | |
| 6,272,868 B1 | 8/2001 | Grabon et al. | |
| 6,276,901 B1 | 8/2001 | Farr et al. | |
| 6,290,043 B1 | 9/2001 | Ginder et al. | |
| 6,293,114 B1 | 9/2001 | Kamemoto | |
| 6,302,654 B1 | 10/2001 | Millet et al. | |
| 6,324,854 B1 | 12/2001 | Jayanth | |
| 6,327,541 B1 | 12/2001 | Pitchford et al. | |
| 6,349,883 B1 | 2/2002 | Simmons et al. | |
| 6,378,315 B1 | 4/2002 | Gelber et al. | |
| 6,393,848 B2 | 5/2002 | Roh et al. | |
| 6,397,606 B1 | 6/2002 | Roh et al. | |
| 6,408,258 B1 | 6/2002 | Richer | |
| 6,453,687 B2 | 9/2002 | Sharood et al. | |
| 6,466,971 B1 | 10/2002 | Humpleman et al. | |
| 6,471,486 B1 | 10/2002 | Centers et al. | |
| 6,487,457 B1 | 11/2002 | Hull et al. | |
| 6,502,409 B1 | 1/2003 | Gatling et al. | |
| 6,526,766 B1 | 3/2003 | Hiraoka et al. | |
| 6,529,839 B1 | 3/2003 | Uggerud et al. | |
| 6,553,774 B1 | 4/2003 | Ishio et al. | |
| 6,571,280 B1 | 5/2003 | Hubacher | |
| 6,571,566 B1 | 6/2003 | Temple et al. | |
| 6,574,561 B2 | 6/2003 | Alexander et al. | |
| 6,577,962 B1 | 6/2003 | Afshari | |
| 6,578,373 B1 | 6/2003 | Barbier | |
| 6,601,397 B2 | 8/2003 | Pham et al. | |
| 6,609,078 B2 | 8/2003 | Starling et al. | |
| 6,618,709 B1 | 9/2003 | Sneeringer | |
| 6,636,893 B1 * | 10/2003 | Fong | 709/223 |
| 6,662,584 B1 | 12/2003 | Whiteside | |
| 6,675,591 B2 | 1/2004 | Singh et al. | |
| 6,708,508 B2 | 3/2004 | Demuth et al. | |
| 6,816,811 B2 | 11/2004 | Seem | |
| 6,892,546 B2 | 5/2005 | Singh et al. | |
| 6,900,738 B2 | 5/2005 | Crichlow | |
| 6,904,385 B1 | 6/2005 | Budike, Jr. | |
| 6,922,155 B1 | 7/2005 | Evans et al. | |
| 6,990,821 B2 * | 1/2006 | Singh et al. | 62/129 |
| 6,996,441 B1 | 2/2006 | Tobias | |
| 6,997,390 B2 | 2/2006 | Alles | |
| 7,003,378 B2 | 2/2006 | Poth | |
| 7,024,870 B2 | 4/2006 | Singh et al. | |
| 7,043,339 B2 | 5/2006 | Maeda et al. | |
| 7,091,847 B2 * | 8/2006 | Capowski et al. | 340/506 |
| 7,114,343 B2 | 10/2006 | Kates | |
| 7,159,408 B2 | 1/2007 | Sadegh et al. | |
| 7,290,398 B2 | 11/2007 | Wallace et al. | |
| 7,328,192 B1 | 2/2008 | Stengard et al. | |
| 7,330,886 B2 | 2/2008 | Childers et al. | |
| 7,337,191 B2 * | 2/2008 | Haeberle et al. | 707/104.1 |
| 7,440,560 B1 | 10/2008 | Barry | |
| 7,454,439 B1 | 11/2008 | Gansner et al. | |
| 7,490,477 B2 | 2/2009 | Singh et al. | |
| 7,555,364 B2 | 6/2009 | Poth et al. | |
| 7,594,407 B2 | 9/2009 | Singh et al. | |
| 7,596,959 B2 | 10/2009 | Singh et al. | |
| 7,636,901 B2 | 12/2009 | Munson et al. | |
| 7,644,591 B2 | 1/2010 | Singh et al. | |
| 7,665,315 B2 | 2/2010 | Singh et al. | |
| 2001/0025349 A1 | 9/2001 | Sharood et al. | |
| 2001/0054291 A1 | 12/2001 | Roh et al. | |
| 2002/0000092 A1 | 1/2002 | Sharood et al. | |
| 2002/0020175 A1 | 2/2002 | Street et al. | |
| 2002/0029575 A1 | 3/2002 | Okamoto | |
| 2002/0082924 A1 | 6/2002 | Koether | |
| 2002/0118106 A1 | 8/2002 | Brenn | |
| 2002/0143482 A1 | 10/2002 | Karanam et al. | |
| 2002/0161545 A1 | 10/2002 | Starling et al. | |
| 2002/0163436 A1 | 11/2002 | Singh et al. | |
| 2002/0173929 A1 | 11/2002 | Seigel | |
| 2002/0198629 A1 | 12/2002 | Ellis | |
| 2003/0005710 A1 | 1/2003 | Singh et al. | |
| 2003/0077179 A1 | 4/2003 | Collins et al. | |
| 2003/0216888 A1 | 11/2003 | Ridolfo | |
| 2004/0019584 A1 | 1/2004 | Greening et al. | |
| 2004/0068390 A1 | 4/2004 | Saunders | |
| 2004/0159113 A1 | 8/2004 | Singh et al. | |
| 2004/0239266 A1 | 12/2004 | Lee et al. | |
| 2004/0261431 A1 | 12/2004 | Singh et al. | |
| 2005/0043923 A1 | 2/2005 | Forster et al. | |
| 2005/0073532 A1 | 4/2005 | Scott et al. | |
| 2005/0086341 A1 | 4/2005 | Enga et al. | |
| 2005/0126190 A1 | 6/2005 | Lifson et al. | |
| 2005/0198063 A1 | 9/2005 | Thomas et al. | |
| 2005/0204756 A1 | 9/2005 | Dobmeier et al. | |
| 2006/0021362 A1 | 2/2006 | Sadegh et al. | |
| 2006/0032245 A1 | 2/2006 | Kates | |
| 2006/0074917 A1 * | 4/2006 | Chand et al. | 707/10 |
| 2006/0242200 A1 | 10/2006 | Horowitz et al. | |
| 2006/0271589 A1 | 11/2006 | Horowitz et al. | |
| 2006/0271623 A1 | 11/2006 | Horowitz et al. | |

| | | | |
|---|---|---|---|
| 2007/0006124 A1* | 1/2007 | Ahmed et al. | 717/101 |
| 2007/0089434 A1 | 4/2007 | Singh et al. | |
| 2007/0089439 A1 | 4/2007 | Singh et al. | |
| 2007/0239894 A1 | 10/2007 | Thind et al. | |
| 2008/0058970 A1 | 3/2008 | Perumalsamy et al. | |

FOREIGN PATENT DOCUMENTS

| | | |
|---|---|---|
| DE | 842 351 | 6/1952 |
| DE | 764 179 | 4/1953 |
| DE | 1144461 | 2/1963 |
| DE | 1403516 | 10/1968 |
| DE | 1403467 | 10/1969 |
| DE | 3133502 | 6/1982 |
| DE | 3422398 | 12/1985 |
| EP | 0 085 246 | 8/1983 |
| EP | 0 254 253 | 1/1988 |
| EP | 0 351 833 | 7/1989 |
| EP | 0 410 330 | 1/1991 |
| EP | 0419857 | 3/1991 |
| EP | 0 453 302 A1 | 10/1991 |
| EP | 0 479 421 | 4/1992 |
| EP | 0 557 023 | 8/1993 |
| EP | 0 579 374 A1 | 1/1994 |
| EP | 0 660 213 A2 | 6/1995 |
| EP | 0 747 598 A2 | 12/1996 |
| EP | 0 877 462 A2 | 11/1998 |
| EP | 0 982 497 A1 | 1/2000 |
| EP | 1008816 | 6/2000 |
| EP | 1 087 142 | 3/2001 |
| EP | 1 138 949 | 10/2001 |
| EP | 1 139 037 | 10/2001 |
| EP | 1187021 A2 | 3/2002 |
| EP | 1 209 427 A1 | 5/2002 |
| EP | 1 241 417 A1 | 9/2002 |
| EP | 1393034 A1 | 3/2004 |
| FR | 2582430 | 11/1986 |
| FR | 2589561 | 7/1987 |
| FR | 2628558 | 9/1989 |
| FR | 2660739 | 10/1991 |
| GB | 2 062 919 A | 5/1981 |
| GB | 2 064 818 | 6/1981 |
| GB | 2 116 635 | 9/1983 |
| JP | 56-10639 | 3/1981 |
| JP | 59-145392 | 8/1984 |
| JP | 61-046485 | 3/1986 |
| JP | 62-116844 | 5/1987 |
| JP | 01014554 A | 1/1989 |
| JP | 02110242 | 4/1990 |
| JP | 02294580 | 12/1990 |
| JP | 04080578 | 3/1992 |
| JP | 06058273 | 3/1994 |
| JP | 08087229 A | 4/1996 |
| JP | 08-284842 | 10/1996 |
| JP | 2003018883 A | 1/2003 |
| JP | 2005241089 | 9/2005 |
| JP | 2005345096 | 12/2005 |
| WO | WO 8601262 | 2/1986 |
| WO | WO 8703988 | 7/1987 |
| WO | WO8802527 | 4/1988 |
| WO | WO9718636 | 5/1997 |
| WO | WO 97/48161 | 12/1997 |
| WO | WO9917066 | 4/1999 |
| WO | WO02/14968 | 2/2002 |
| WO | WO02/090840 | 11/2002 |
| WO | WO02/090913 | 11/2002 |
| WO | WO-02090914 A1 | 11/2002 |
| WO | WO2005/022049 | 3/2005 |
| WO | WO2006/091521 | 8/2006 |

OTHER PUBLICATIONS

European Search Report for EP 82306809.3; Apr. 28, 1983; 1 Page.
European Search Report for EP 91 30 3518; Jul. 22, 1991; 1 Page.
European Search Report for EP 01 30 7547; Feb. 20, 2002; 1 Page.
European Search Report for EP 96 30 4219; Dec. 1, 1998; 2 Pages.
European Search Report for EP 99 30 6052; Dec. 28, 1999; 3 Pages.
European Search Report for EP 94 30 3484; Apr. 3, 1997; 1 Page.
European Search Report for EP 93 30 4470; Oct. 26, 1993; 1 Page.
European Search Report for EP 02 25 0266; May 17, 2002; 3 Pages.
European Search Report for EP 98 30 3525; May 28, 1999; 2 Pages.
International Search Report; International Application No. PCT/IB96/01435; May 23, 1997; 1 Page.
International Search Report; International Application No. PCT/US98/18710; Jan. 26, 1999; 1 Page.
International Search Report, International Application No. PCT/US2006/040964, dated Feb. 15, 2007, 2 Pages.
European Search Report for EP 02 73 1544, Jun. 18, 2004, 2 Pages.
European Search Report for EP 02 72 9050, Jun. 17, 2004, 2 Pages.
International Search Report, International Application No. PCT/US02/13456, dated Aug. 22, 2002, 2 Pages.
International Search Report, International Application No. PCT/US2004/027654, dated Aug. 25, 2004, 4 Pages.
PIN Carmen, Baranyi Jozsef, Predictive Models as Means to Quantify the Interactions of Spoilage Organisms, International Journal of Food Microbiology, ol. 41, No. 1, 1998, pp. 59-72, XP-002285119.
International Search Report, Int'l. App. No. PCT/US 06/05917, dated Sep. 26, 2007.
Written Opinion of the International Searching Authority, Int'l. App. No. PCT/US 06/05917, dated Sep. 26, 2007.
Torcellini, P., et al., "Evaluation of the Energy Performance and Design Process of the Thermal Test Facility at the National Renewable Energy Laboratory", dated Feb. 2005.
Office Action regarding U.S. Appl. No. 11/497,644, dated Jan. 29, 2010.
Interview Summary regarding U.S. Appl. No. 11/497,644, dated May 4, 2010.
Ultrasite 32 User's Guide, Computer Process Controls, Sep. 28, 1999.
Ultrasite User's Guide BEC Supplement, Computer Process Controls, Oct. 6, 1997.
Ultraside User's Guide BCU Supplement, Computer Process Controls, Sep. 4, 1997.
Ultrasite User's Guide RMCC Supplement, Computer Process Controls, Jun. 9, 1997.
Office Action for U.S. Appl. No. 11/497,579 dated Oct. 27, 2009.
Office Action for U.S. Appl. No. 11/497,644, dated Dec. 19, 2008.
Office Action for U.S. Appl. No. 11/497,644, dated Jul. 10, 2009.
Supplementary European Search Report regarding Application No. EP06735535, dated Nov. 23, 2009.
International Search Report for PCT/US02/13459; ISA/US; date mailed Sep. 19, 2002, 4 Pages.
Office Action regarding U.S. Appl. No. 11/497,644, dated Jun. 14, 2010.
Final Office Action regarding U.S. Appl. No. 11/497,579, dated May 14, 2010.
First Office Action from the Patent Office of the People's Republic of China dated Jun. 8, 2007, Application No. 200480027753.6 and Translation provided by CCPIT.
First Official Report regarding Australian Patent Application No. 2007214381, dated Dec. 12, 2008.
Liao et al., A Correlation of Optimal Heat Rejection Pressures in Transcritical Carbon Dioxide Cycles, Applied Thermal Engineering 20 (2000) 831-841.
Second Official Report regarding Australian Patent Application No. 2007214381, dated Oct. 30, 2009.
UltraSite User's Guide, Computer Process Controls, Apr. 1, 1996.
Vandenbrink et al., "Design of a Refrigeration Cycle Evaporator Unit," Apr. 18, 2003.
Examiner's First Report on Australian Patent Application No. 2002259066, dated Mar. 1, 2006.
European Search Report regarding Application No. EP02729051, dated Feb. 17, 2005.
Second Examination Communication regarding European Application No. EP02729051.9, dated Jul. 3, 2006.

First Examination Communication regarding European Application No. EP02729051.9, dated Dec. 23, 2005.

International Preliminary Examination Report regarding PCT/US02/13459, dated Sep. 15, 2003.

Written Opinion regarding PCT/US02/13459, dated Apr. 23, 2003.

Interview Summary regarding U.S. Appl. No. 11/497,579, dated Jul. 15, 2010.

* cited by examiner

Figure 32

ENTERPRISE CONTROL AND MONITORING SYSTEM AND METHOD

CROSS-REFERENCE TO RELATED APPLICATIONS

This application is a continuation of PCT International Application No. PCT/US06/05917, filed on Feb. 21, 2006, which claims the benefit of U.S. Provisional Application No. 60/654,719, filed on Feb. 21, 2005. The disclosures of the above applications are incorporated herein by reference.

FIELD

The present disclosure relates to control and monitoring of building systems.

BACKGROUND

The statements in this section merely provide background information related to the present disclosure and may not constitute prior art.

Retail outlets, particularly food retailers, require a plurality of building systems during operation. Such building systems often include refrigeration systems, anti-condensate heating (ACH) systems, lighting systems, and HVAC systems. Each of these building systems includes associated equipment and controllers configured to perform various functions. For example, refrigeration systems include compressors, condensers, evaporators, and the like, connected to a refrigeration system controller and configured to cool refrigeration cases to a desired temperature.

Building system performance may be monitored by monitoring building system operating parameters and associated data, such as set point, temperature and pressure data, via the refrigeration system controller. Building system performance impacts the retailer profit. Building system operating data and operating parameters must be monitored to ensure that the building systems are operating correctly, efficiently, and cost effectively.

Traditionally, access to building system controller operating data and parameters is done piece meal, one controller at a time. It is difficult for a retailer, accessing building system controllers in this manner, to monitor all the building systems of a given retail location. It is even more difficult to monitor all the building systems of a retailer across all of the various retail locations. It is also difficult for a retailer to backup, or restore, building system data and operating parameters for all the retailer's various building systems. It is also difficult to effectuate an operating parameter change across all building systems.

SUMMARY

Further areas of applicability will become apparent from the for purposes of illustration only and are not intended to limit the scope of the present disclosure.

A method is provided comprising grouping a plurality of building system controllers into at least one control system group. The at least one control system group corresponds to at least one connected group of the building system controllers. The method also comprises grouping the at least one control system group into at least one site group, the at least one site group corresponding to a physical location of the at least one control system group. The method further comprises selecting a group from the at least one site group and the at least one control system group, performing an activity on each controller within said selected group.

In other features, the method may comprise grouping the at least one site group into at least one directory, selecting a directory, and performing the activity on all controllers within said selected directory.

In other features, the activity may be a backup activity comprising retrieving operating data from each controller within the selected group, and storing the operating data from each controller within the selected group in a database.

In other features, the activity may be a restore activity comprising retrieving operating data from a database, and providing the operating data to each controller within the selected group.

In other features, the activity may comprise receiving inputted data, and providing the inputted data to each controller within said selected group.

In other features, the activity may comprise retrieving logged data from each controller within the selected group.

In other features, the method may further comprise displaying the at least one site group and the at least one control system group in a navigational tree, wherein the navigational tree includes a node for each of the at least one site group and the at least one control system group.

In other features, the plurality of building system controllers may include at least one of a refrigeration system controller, an anti-condensate heater controller, an HVAC controller, a lighting controller, a sprinkler irrigation system controller, a fire alarm system controller, a carbon monoxide alarm system controller, an elevator system controller, and a fuel pump dispenser system controller.

In other features, the method may further comprise scheduling the activity to be performed at a predetermined time, wherein the performing the activity occurs at the predetermined time.

In other features, the method may further comprise receiving an alarm from at least one building system controller of the plurality of building system controllers, wherein the performing the activity occurs in response to the alarm.

In other features, the method may further comprise scheduling the activity to be performed on a recurring basis, wherein the performing the activity occurs according to the recurring basis.

In other features, the method may further comprise viewing a history of performed activities.

In other features, the method may further comprise displaying the history in a navigational tree including a node for each activity performed, expanding a partially completed activity node, and displaying portions of the partially completed activity associated with said partially completed activity node that completed and portions that failed.

A method of displaying building system controller data is also provided comprising receiving a user login associated with predefined user access privileges, receiving a building system controller selection, requesting a listing of building system controller applications and activities from a building system controller associated with the building system controller selection, and generating a display of available building system controller applications and allowable activities based on the user access privileges and based on the listing.

In other features, the activities may include at least one of a backup activity, a restore activity, a send data to controller activity, a retrieve logs activity, a refresh activity, and a terminal mode activity.

In other features, the method may further comprise displaying groups of building system controllers in a navigational tree, wherein the navigational tree includes a node for each group.

In other features, the receiving the building system controller selection may comprise receiving a node selection from said navigational tree.

In other features, the method may comprise receiving at least one additional building system controller selection, wherein the requesting the listing of building system controller applications and activities and the generating the display of available building system controller applications and allowable activities occurs with each selection of the at least one additional building system controller selection.

In other features, the building system controller selection may comprise at least one of a refrigeration system controller, an anti-condensate heater controller, an HVAC controller, a lighting controller, a sprinkler irrigation system controller, a fire alarm system controller, a carbon monoxide alarm system controller, an elevator system controller, and a fuel pump dispenser system controller.

In other features, the method may further comprise receiving a user configuration instruction and modifying the user access privileges based on the user configuration instruction.

A method of displaying building system controller data is also provided comprising receiving a first set of building system controller data points associated with a first building system controller, receiving a second set of building system controller data points associated with a second building system controller; and displaying the first and second building system controller data points.

In other features, the method comprises generating a graphical display of the first and second building system controller data points.

In other features, the first building system controller and the second building system controller are located at different sites.

In other features, the first and second set of data points may be displayed according to a time zone location of a user viewing said graph.

In other features, the first and second set of data points may be displayed according to a time zone location of the first and second building system controllers.

A building system control and monitoring system is provided comprising a building system controller having a network connection, a server communicatively connected to the network connection, and a plurality of clients communicatively connected to the server. The server provides data associated with the building system controller to each of the plurality of clients by sharing the network connection across the plurality of clients.

In other features, at least one of the plurality of clients may generate a terminal mode display based on said received data associated with the building system controller.

In other features, the building system controller may be at least one of a refrigeration system controller, an anti-condensate heater controller, an HVAC controller, a lighting controller, a sprinkler irrigation system controller, a fire alarm system controller, a carbon monoxide alarm system controller, an elevator system controller, and a fuel pump dispenser system controller.

In other features, the first client of the plurality of clients may initiate a first activity for the building system controller, a second client of the plurality of clients may initiate a second activity for the building system controller, and the first activity and the second activity may be concurrently performed by the server.

In other features, the first activity and the second activity may be selected from the group consisting of a backup activity, a restore activity, a refresh activity, a send data to controller activity, a terminal mode activity, and a retrieve logs activity.

In other features, the network connection comprises a modem.

In other features, a computer-readable medium having computer executable instructions for performing the above methods is provided.

DRAWINGS

The drawings described herein are for illustration purposes only and are not intended to limit the scope of the present disclosure in any way.

FIG. 32 is a screen shot of an activity history of an enterprise control and monitoring system.

DETAILED DESCRIPTION

Figure 1:
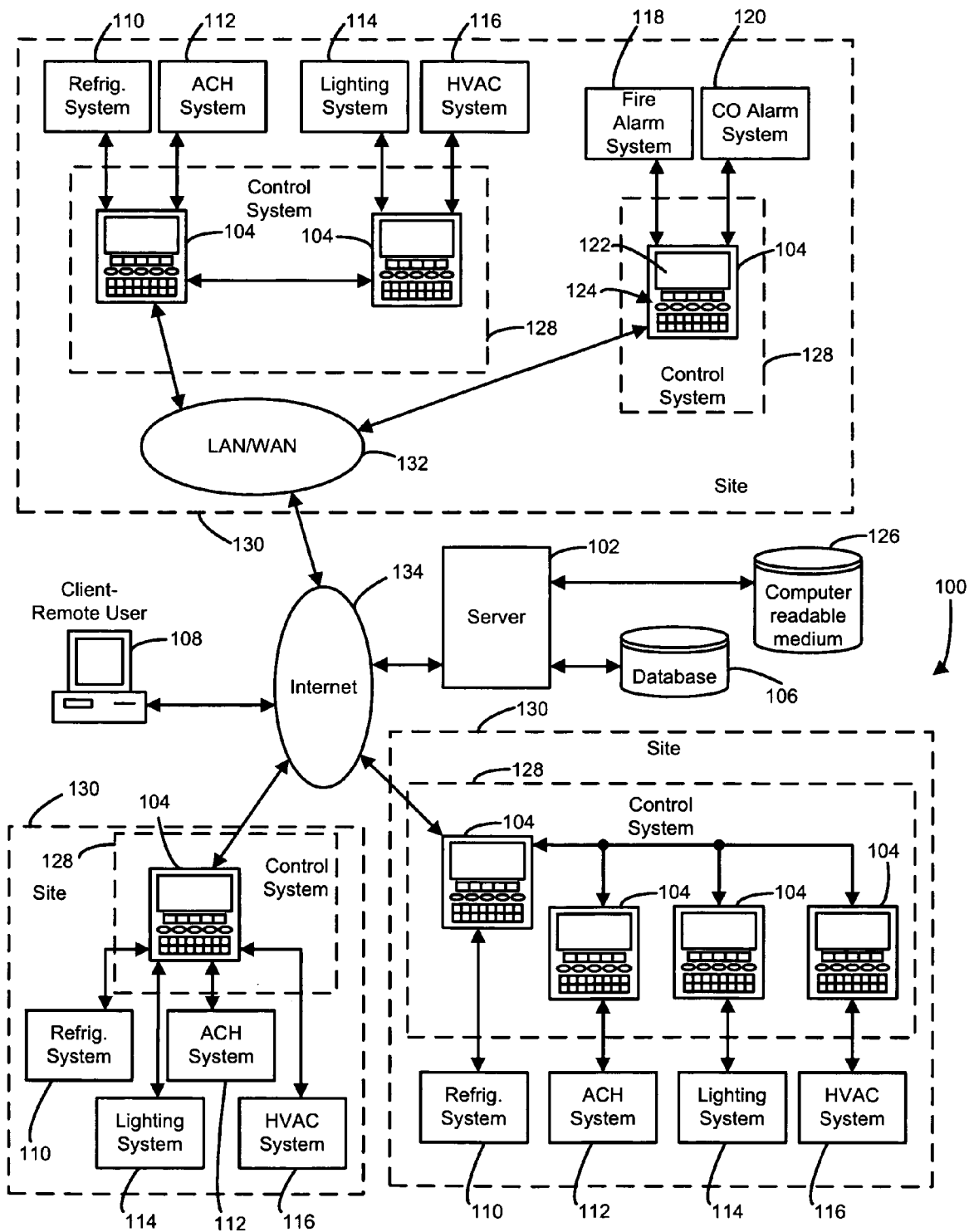
FIG. 1 is a schematic illustration of an exemplary enterprise control and monitoring system.

The following description is merely exemplary in nature and is not intended to limit the present teachings, applications, or uses. It should be understood that throughout the drawings, corresponding reference numerals indicate like or corresponding parts and features. As used herein, the terms module, control module, computer, and controller refer to an application specific integrated circuit (ASIC), one or more electronic circuits, a processor (shared, dedicated, or group) and memory that execute one or more software or firmware programs, a combinational logic circuit, and/or other suitable components that provide the described functionality. Further, as used herein, computer-readable medium refers to any medium capable of storing data for a computer. Computer-readable medium may include, but is not limited to, CD-ROM, floppy disk, magnetic tape, other magnetic medium capable of storing data, memory, RAM, ROM, PROM, EPROM, EEPROM, flash memory, punch cards, dip switches, or any other medium capable of storing data for a computer.

With reference to FIG. 1, an enterprise control and monitoring system 100 may include a server 102, networked with building system controllers 104, and connected to a database 106 and to a client 108. The server 102 and the client 108 are computers that execute portions the enterprise control and monitoring system software. The controllers 104 may control refrigeration systems 110, ACH systems 112, lighting systems 114, HVAC systems 116, fire alarm systems 118, and carbon monoxide alarm systems 120. Other building systems, with associated controllers, may be included as well. For example, sprinkler irrigation systems, elevator systems, fuel pump dispenser systems, and the like, may also be included.

A single controller 104 may control one or more building systems. For example, a single controller 104 may control both a refrigeration system 110 and an ACH system 112. Further, a single controller 104 may also control both a lighting system 114 and an HVAC system 116. A single controller 104 may also control a refrigeration system 110, a lighting system 114, an ACH system 112, and an HVAC system 116. The controllers 104 may be Einstein or E2 controllers available from Computer Process Controls, Inc., 1640 Airport Road Suite #104, Kennesaw, Ga. 31044, such as the E2 RX refrigeration controller, the E2 BX HVAC controller, or the E2 CX convenience store controller.

The controller 104 may include an output monitor screen 122 and keyboard input controls 124. A user in front of the controller 104 may view controller operating data and operating parameters on the output monitor screen 122 by navigating the controller menu navigation system with the keyboard input controls 124. A user may also modify certain controller operating parameters, such as set points, with the keyboard input controls 124. As described below, a user may also view an output monitor screen 122 of a controller by utilizing the terminal mode of the client.

The server 102 may load server software from a computer-readable medium 126 that stores the server software. The server may access building system operating parameters and data via network connections to the various controllers 104. Client software may be loaded from computer readable medium as well. The client software may be executed on a local or remote computer. The client software may include a dynamic web based user interface that allows a user to access and view the building system operating parameters and data retrieved and stored by the server 102. The server 102 may perform data management activities, such as data backups and data restores, in response to instructions from the client software. A user operating the client may also modify building system operating parameters of the controllers 104, or perform activities on the controllers 104, as desired.

Controllers 104 may be grouped together in control systems 128. In a control system 128, one of the controllers 104 may function as a gateway and provide communication access to the other controllers 104 in the control system 128. A control system 128 may include a single controller 104 as well.

A site 130 may include one or more control systems 128 in one physical location, such as a retail store.

As shown in FIG. 1, three different sites 130, representing three different physical locations, are shown. The sites 130 are all located remote from each other and from the server 102 and database 106. As can be appreciated, the server 102 may alternatively be located at any site 130.

Controllers 104 may communicate with each other, and with the server 102 via TCP/IP connections or other suitable network communication protocols. Control systems 128 may be connected to a local area network (LAN) or a wide area network (WAN), ie. LAN/WAN 132 at a site 130. The server 102 may connect to the control systems 128, and the controllers 104, via the internet 134 and the LAN/WAN 132 at the site 130. The control systems 128 and controllers 104 may alternatively be connected directly to the internet 134 via a suitable modem and dialup, DSL, cable, or other internet connection.

Figure 2:
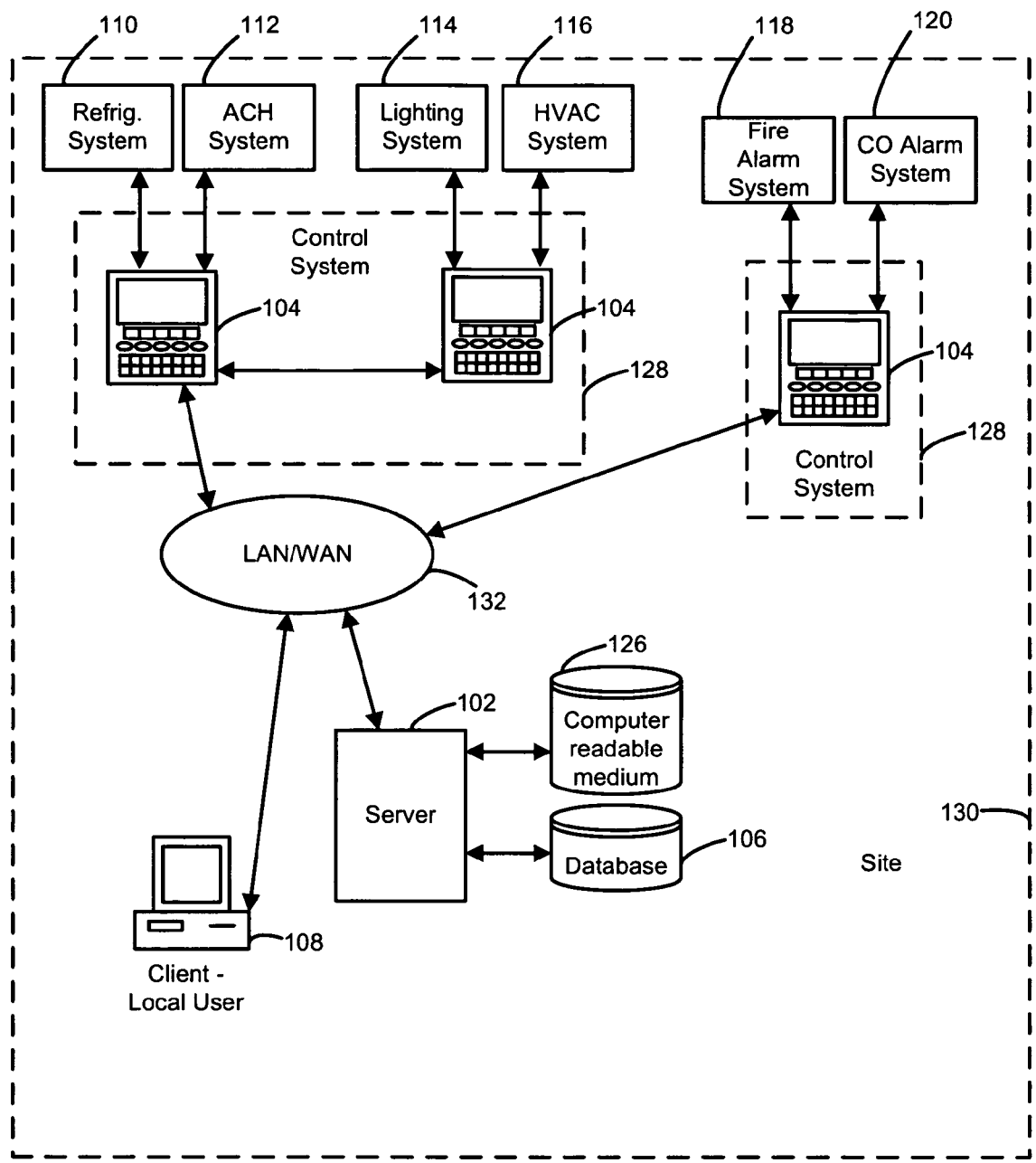
FIG. 2 is a schematic illustration of another exemplary enterprise control and monitoring system.

With reference to FIG. 2, the server 102, database 106, controllers 104, control systems 128, and client 108 may be contained entirely within a site 130 and connected to each other via the LAN/WAN 132. In such case, a local user accesses the server 102 locally via the LAN/WAN 132.

Figure 3:
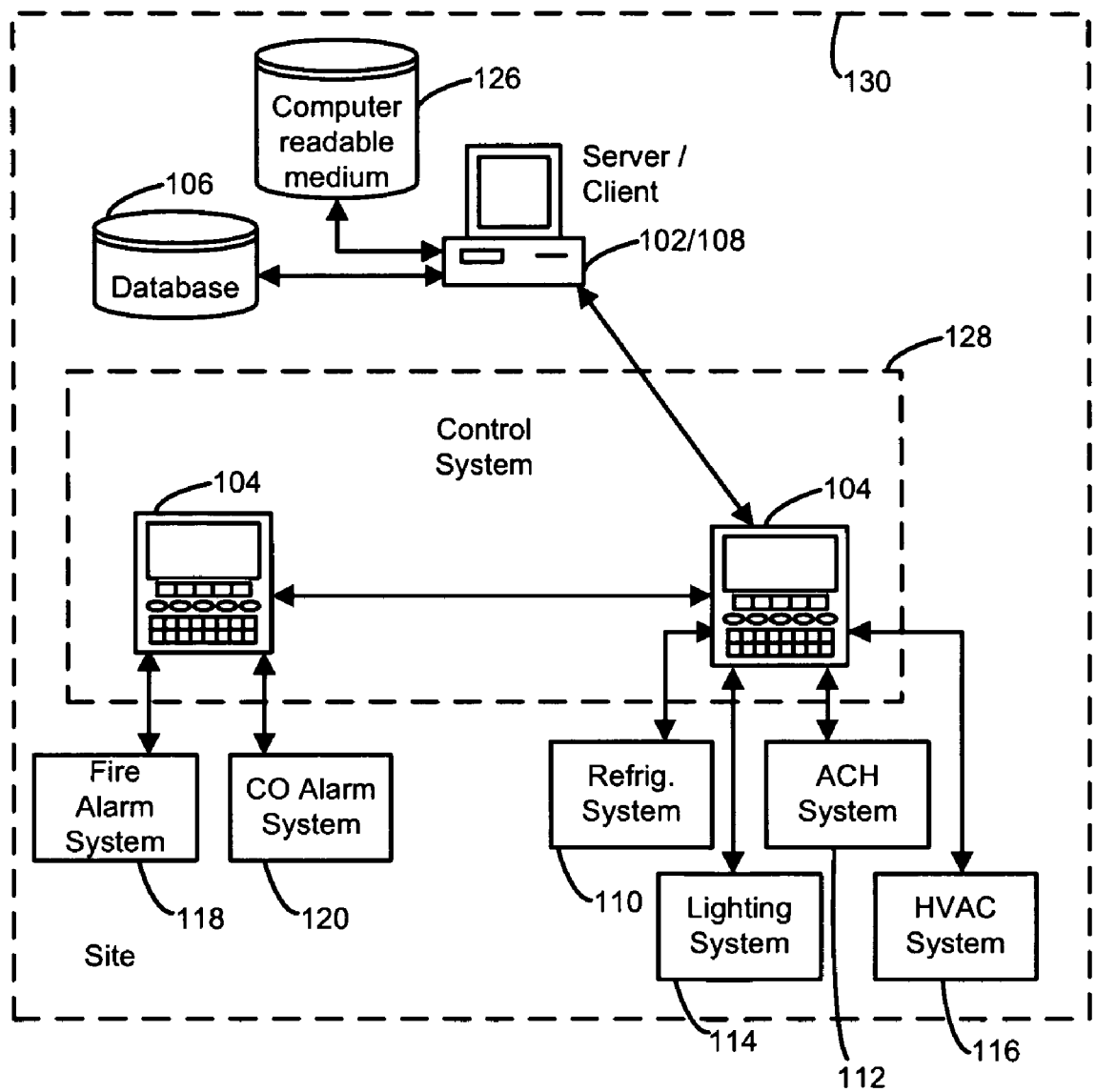
FIG. 3 is a schematic illustration of another exemplary enterprise control and monitoring system.

With reference to FIG. 3, a controller 104 may be connected directly to a computer via a modem located on the controller 104. The computer executes the server and client software. In such case, the computer functions as both client 108 and server 102. The computer may communicate with the controller 104, and receive operating data and operating parameters related to each controller 104 within the control system 128, via the controller modem. In this way, communication is made directly with the controller 104 without accessing a LAN/WAN 132 or the internet 134. Such a "stand alone" system may provide additional desired security.

As can be appreciated, while specific network configurations are shown in FIGS. 1-3, any number of network configuration variations may be used, with any number of combinations of controllers 104, control systems 128, and sites 130. As shown in FIG. 1, multiple sites 130, each with different local network configurations, may be connected to the server 102.

Figure 4:
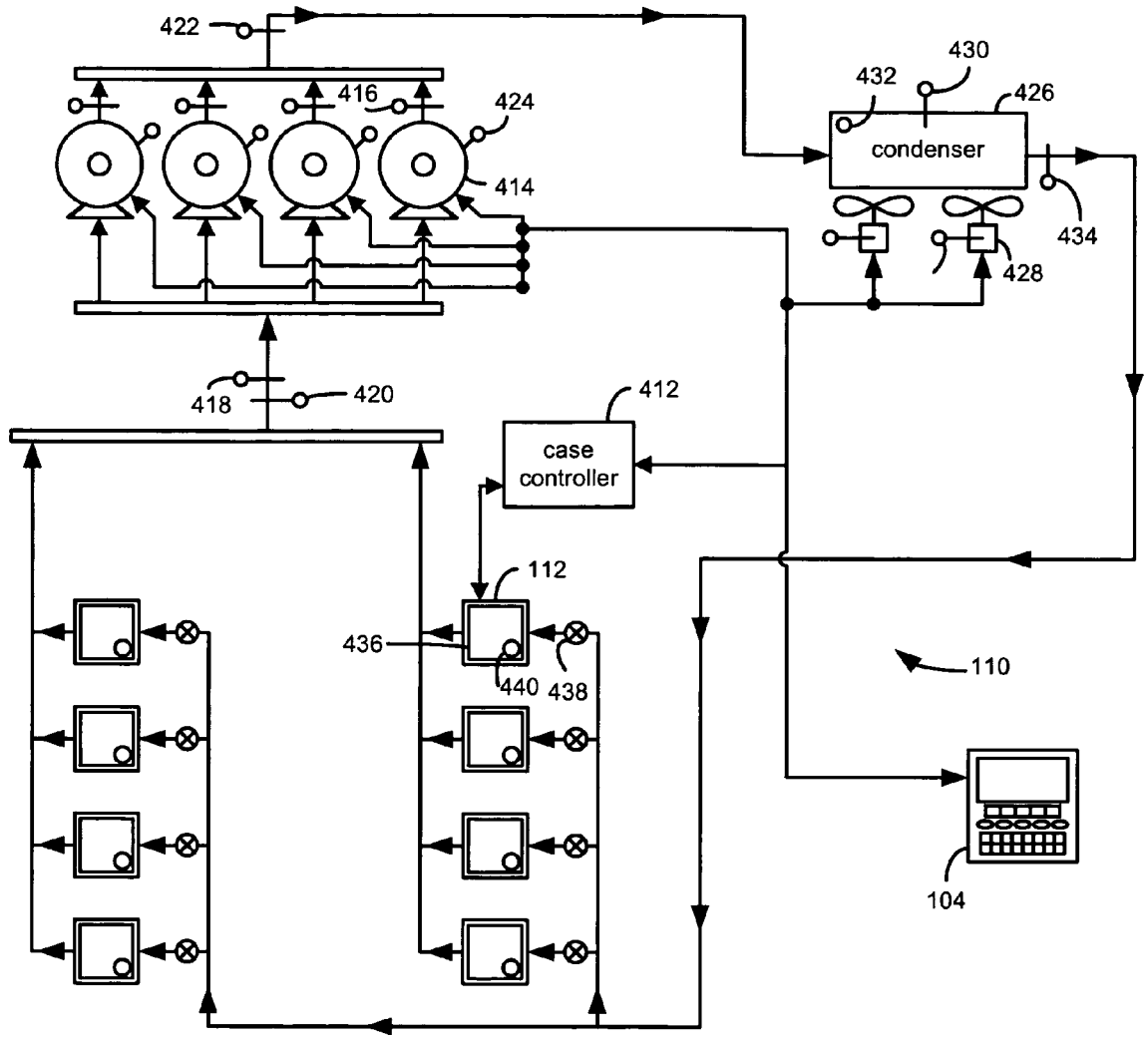
FIG. 4 is a schematic illustration of a refrigeration system.

The building systems are described with reference to FIGS. 4-7. In FIG. 4, a refrigeration system 110 may include refrigeration cases 412, as well as a plurality of compressors 414 piped together. A discharge output of each compressor 414 may include a respective compressor temperature sensor 416. A suction inlet may include both a suction pressure sensor 418 and a suction temperature sensor 420. Further, a discharge outlet may include a compressor discharge pressure sensor 422. An electrical current sensor 424 may be attached to each compressor 414. The various sensors may be connected to the controller 104 which controls and monitors compressor operation.

The compressors 414 compress refrigerant vapor that is delivered to a condenser 426. Condenser fans 428 may enable improved heat transfer from the condenser 426. The condenser 426 may include an associated ambient temperature sensor 430, a condenser temperature sensor 432, and a condenser discharge pressure sensor 434. An electrical current sensor 436 may be attached to each condenser fan 428. The various sensors may each be connected to the controller 104 which controls condenser fan operation.

Each refrigeration case 412 may include its own evaporator 436, its own expansion valve 438 for controlling the superheat of the refrigerant, and its own temperature sensor 440. A case controller 442 may control the refrigeration cases 412 and may be connected to the controller 104. Additional case controllers 442 may be used as needed. Alternatively, the controller 104 may control the refrigeration cases 412 directly. Refrigerant passes through the expansion valve 438 where a pressure drop causes the high pressure liquid refrigerant to achieve a lower pressure combination of liquid and vapor. The temperature sensor 440 may be connected to the case controller 442 which communicates with the controller 104.

As with all of the building systems, the controller 104 may receive operating data for the refrigeration system 110 from the respective temperature, pressure, and current sensors. The operating data, along with various operating parameters such as set points, may be utilized by the controller 104 to operate the refrigeration system 110. The controller 104 may store the operating data and operating parameters in various logs. The server 102 may communicate with the controller 104 to retrieve and monitor the operating data, operating parameters, and logs. The server 102 may also direct the controller 104 to modify certain operating parameters, such as set points, to control the refrigeration system 110 as desired.

Figure 5:
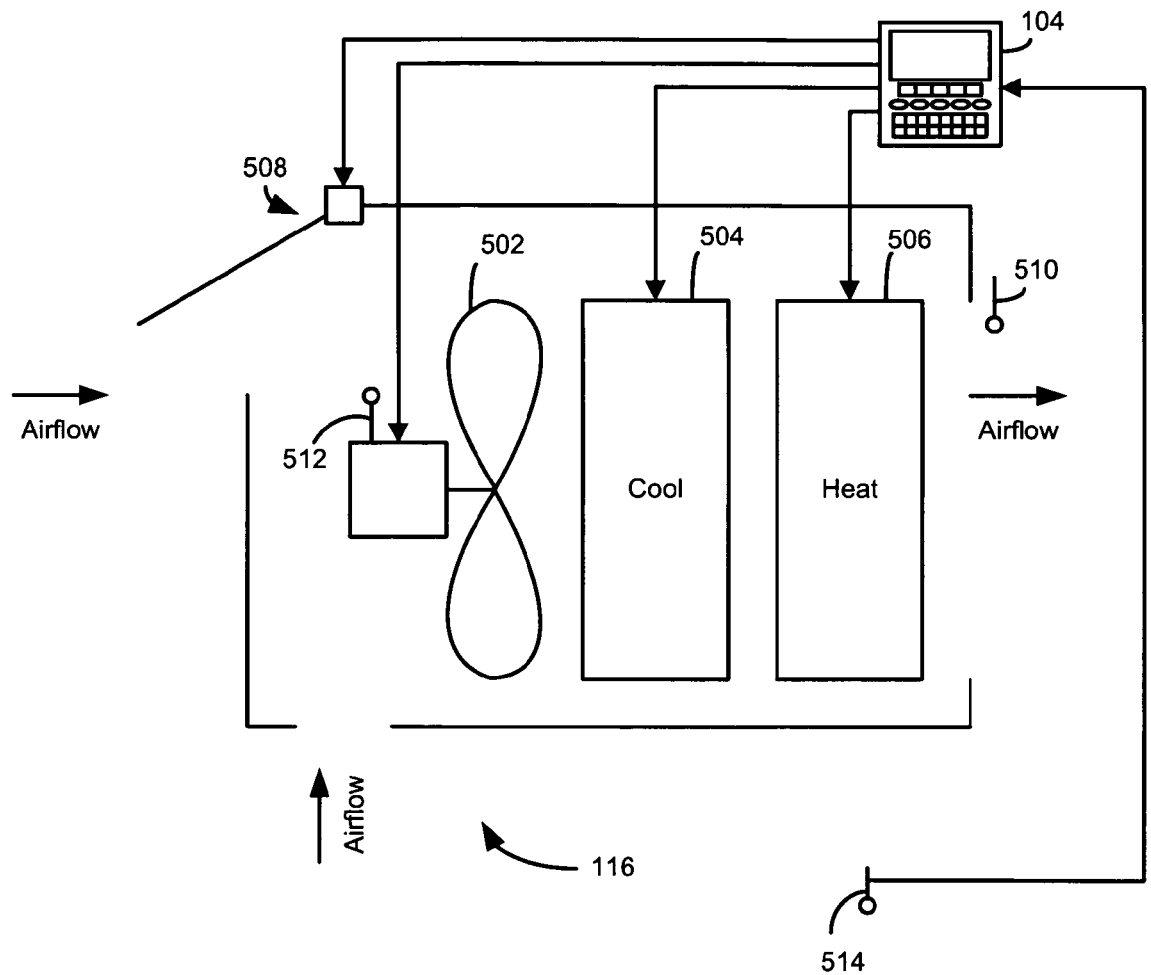
FIG. 5 is a schematic illustration of an HVAC system.

Referring now to FIG. 5, the HVAC system 116 may include a fan 502 as well as a cooling apparatus 504, a heating apparatus 506, and a damper 508, if appropriate. The controller 104 may control the fan 502, cooling apparatus 504, heating apparatus 506, and damper 508 to heat or cool as desired. A temperature sensor 510 may indicate a temperature of air exiting the cooling apparatus 504 or heating apparatus 506. An electrical current sensor 512 may be attached to the fan 502. A room temperature sensor 514 is also placed proximate the heated/cooled area. The controller 104 may receive operating data and operating parameters of the HVAC system 116 from the temperature sensor 514 and electrical current sensor 512. As can be appreciated, additional room temperature sensors may be used depending on the size and configuration of the interior of the building to be heated or cooled.

Figure 6:
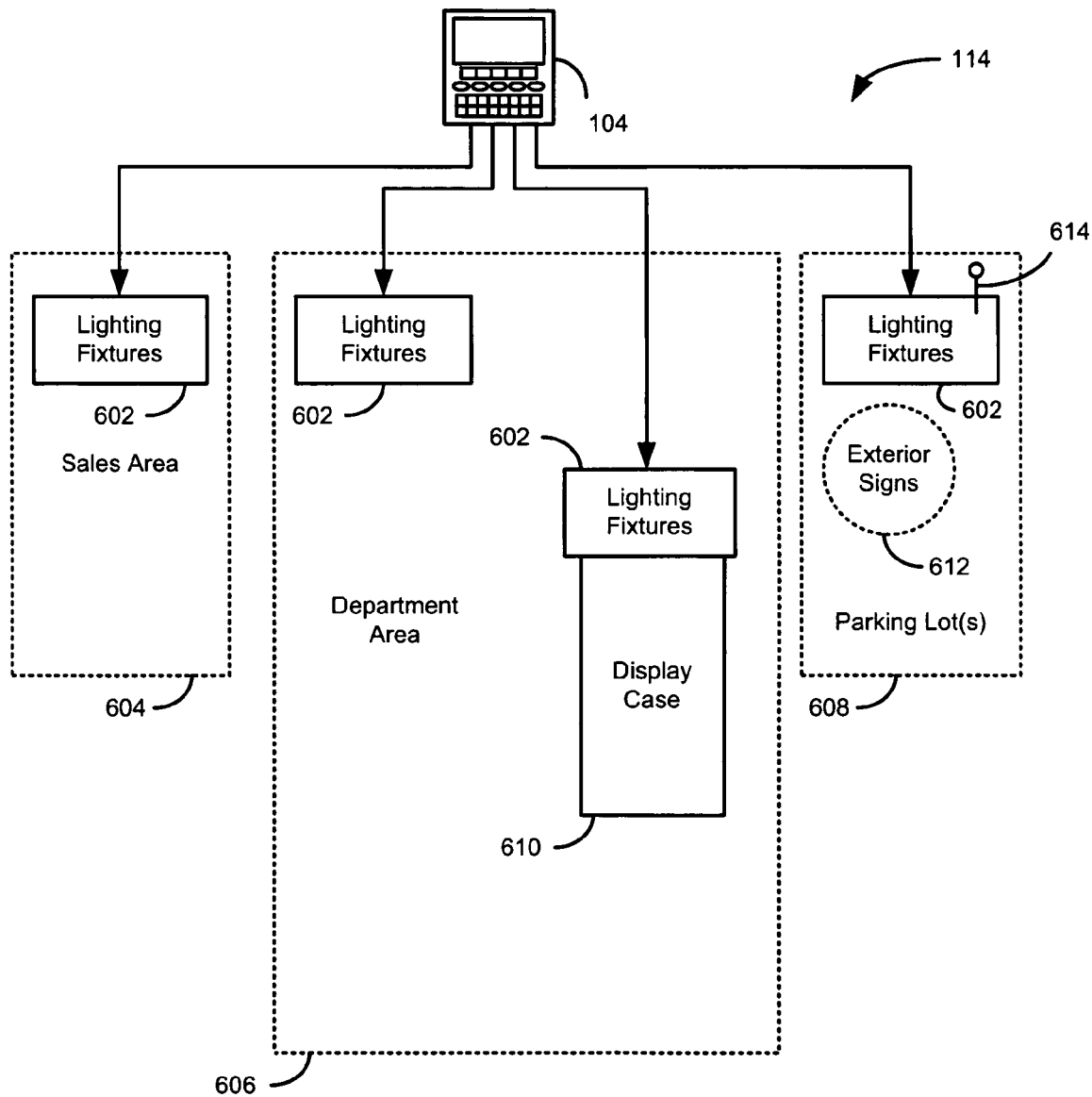
FIG. 6 is a schematic illustration of a lighting system.

Referring now to FIG. 6, a lighting system 114 may include one or more lighting fixtures 602 which communicate with the lighting controller 104. The lighting fixtures 602 are shown in various areas of the building and its exterior, with some areas including multiple types of fixtures. For example, a sales area 604, a department area 606, and a parking lot 608 each include lighting fixtures 602. The department area 606 may include lighting fixtures 602 for a display case 610 therein. The parking lot 608 may include lighting fixtures 602 as well as exterior sign lighting 612. The parking lot lighting fixtures 602 may be equipped with a light sensor 614 and configured to turn on at dusk. The various lighting fixtures 602 may be in communication with the lighting controller 104 via direct or wireless connections. Any suitable network connection, allowing communication between the lighting controller 104 and the lighting fixtures 602 may be used.

Figure 7:
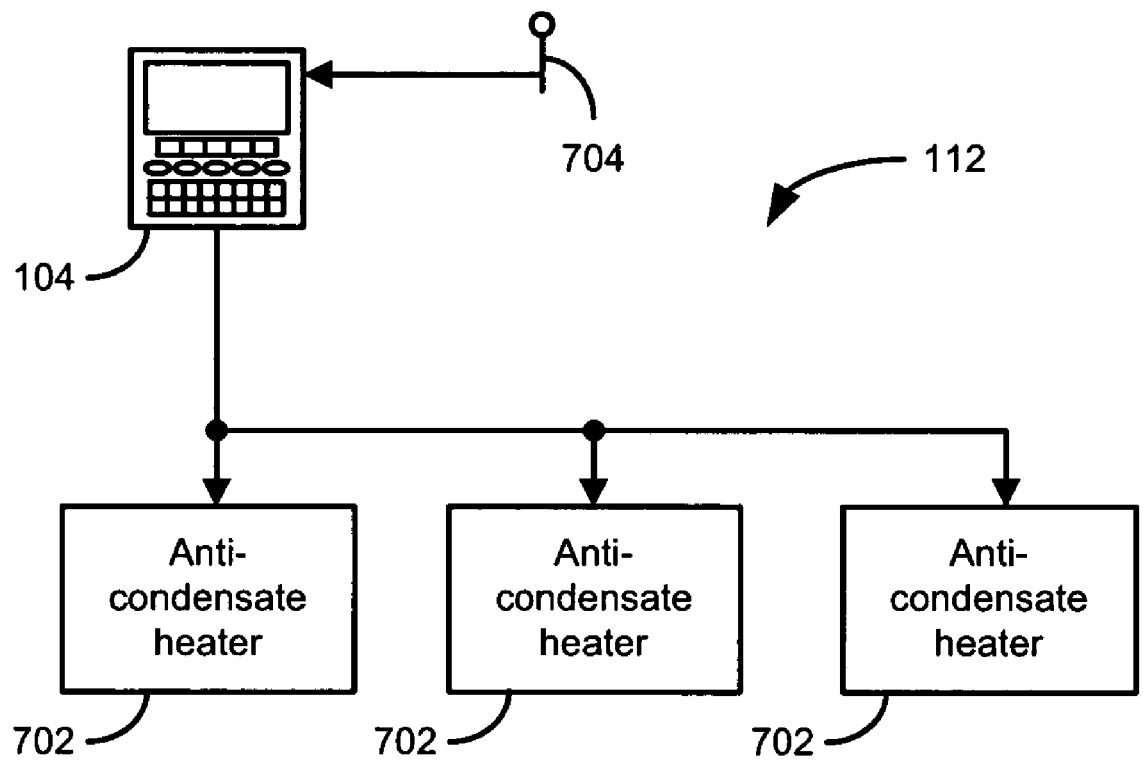
FIG. 7 is a schematic illustration of an anti-condensate heater system.

Referring to FIG. 7, an ACH system 112 may include anti-condensate heaters 702 in communication with the controller 104. The controller 104 may receive dew point data from a dew point sensor 704. Alternatively, the controller 104 may receive temperature and relative humidity data from temperature and relative humidity sensors and calculate the dew point. The controller 104 may operate the anti-condensate heaters 702 based on the dew point to heat glass refrigeration case displays to prevent condensation.

The controllers 104 may receive operating data and operating parameters for each of the building systems. The server 102 may communicate with the controllers 104 to retrieve and monitor the operating data, operating parameters, and logs. In this way, the server 102 may access the operating data and operating parameters, including sensed and calculated variables. As described below, a user may access the data retrieved and stored by the server 102 to monitor or modify the operation of a specified building system, controller 104, control system 128, site 130 or grouping thereof. In this way, the server 102 may provide the user, via a dynamic web based user interface, a "view" into the building systems, controllers 104, control systems 128, sites 130 and groupings thereof.

Figure 8:
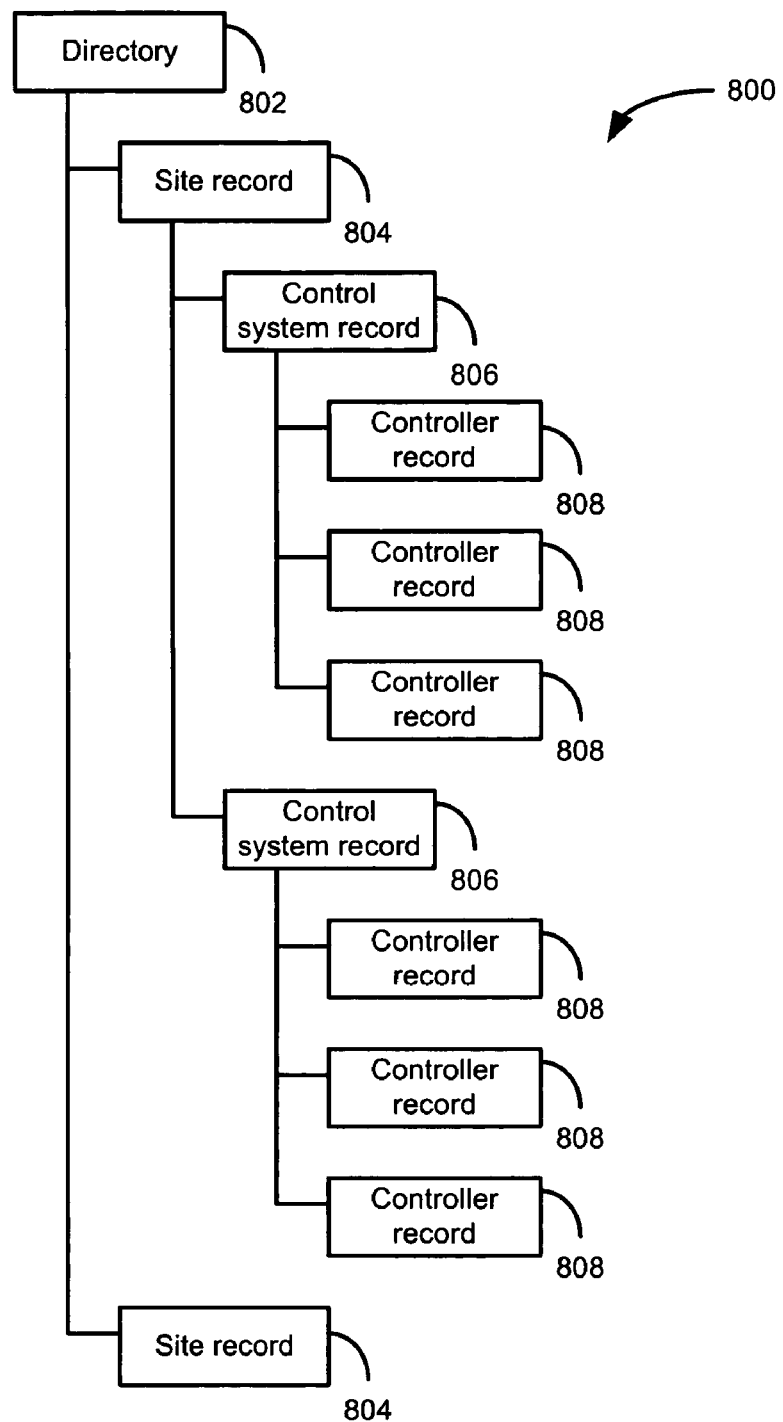
FIG. 8 is a data structure of an enterprise control and monitoring system.

Referring now to FIG. 8, an enterprise control and monitoring system data structure 800 may include, at the highest level, a directory 802. A directory may hold a list of multiple site records 804 and may also include other directories. The site records 804 correspond to the sites 130 described above with reference to FIGS. 1-3. The site records 804 may hold one or more control system records 806. The control system records 806 correspond to the control systems 128 described above with reference to FIGS. 1-3. The control system records 806 may hold controller records 808. The controller records 808 may correspond to the controllers 1904 described above with reference to FIGS. 1-3. The server 102 may utilize the data structure 800 to organize building system data in a hierarchical form. The data structure 800 allows the server 102 to perform a desired operation at a given node of the data structure 800. As described in more detail below, the operation is performed on the lower nodes in the hierarchy. In this way, a user may update or modify multiple controllers 104 with a single command.

Figure 9:
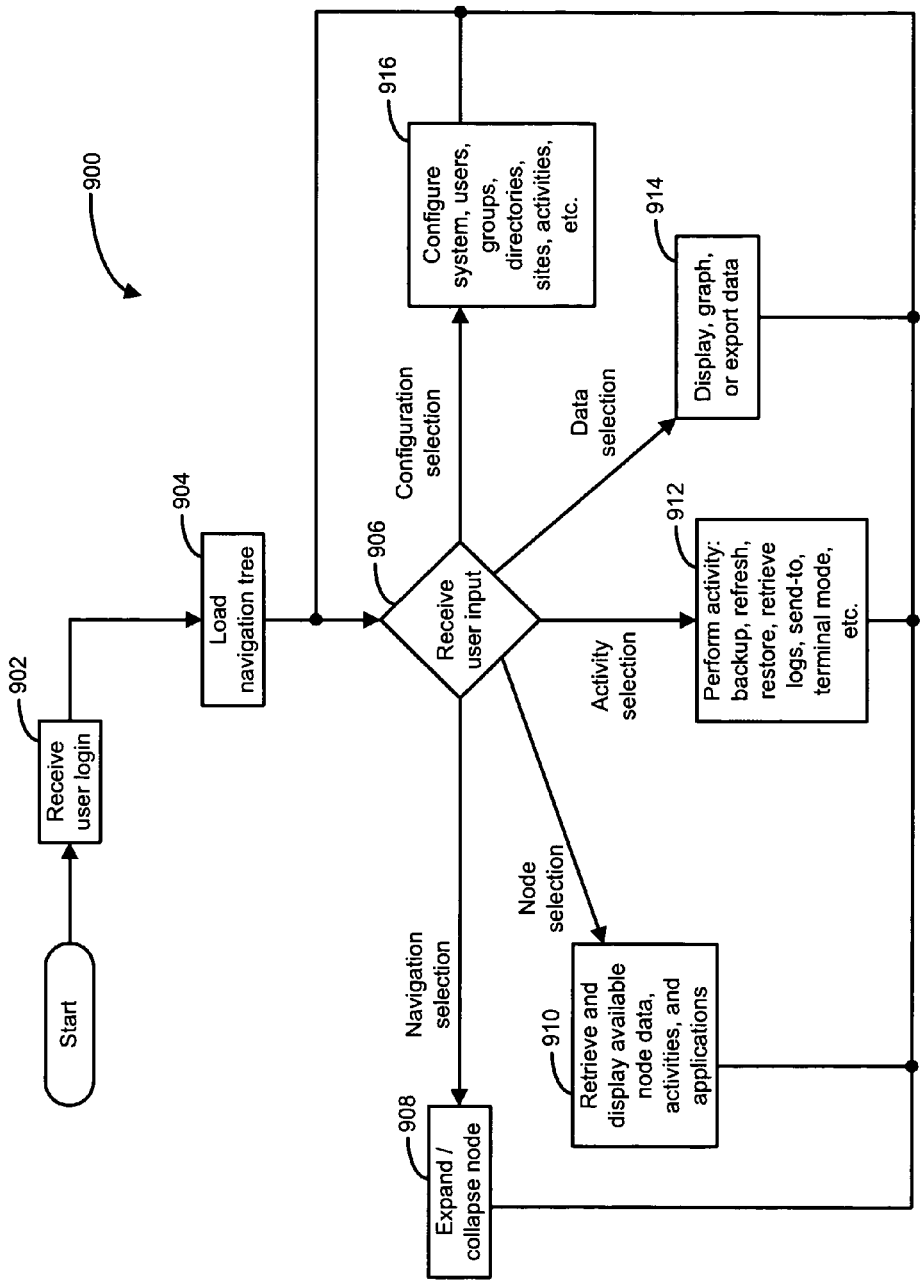
FIG. 9 is a flow chart for an enterprise control and monitoring system.

Referring now to FIG. 9, and with additional reference to screen shots shown in FIGS. 12-32, an enterprise control and monitoring system algorithm 900 is described. The algorithm is executed by the server based on instructions received from a client.

The client software may include a dynamic web based graphical user interface, depicted by the screen shots shown in FIGS. 12-32. The user interface is dynamic in that user interface displays are built "on-the-fly" according to the options, applications, and activities available to the particular user, based on the user's login access privileges, and based on the particular data, applications, and activities allowable or available for a given controller, control system, site, or directory.

Figure 12:
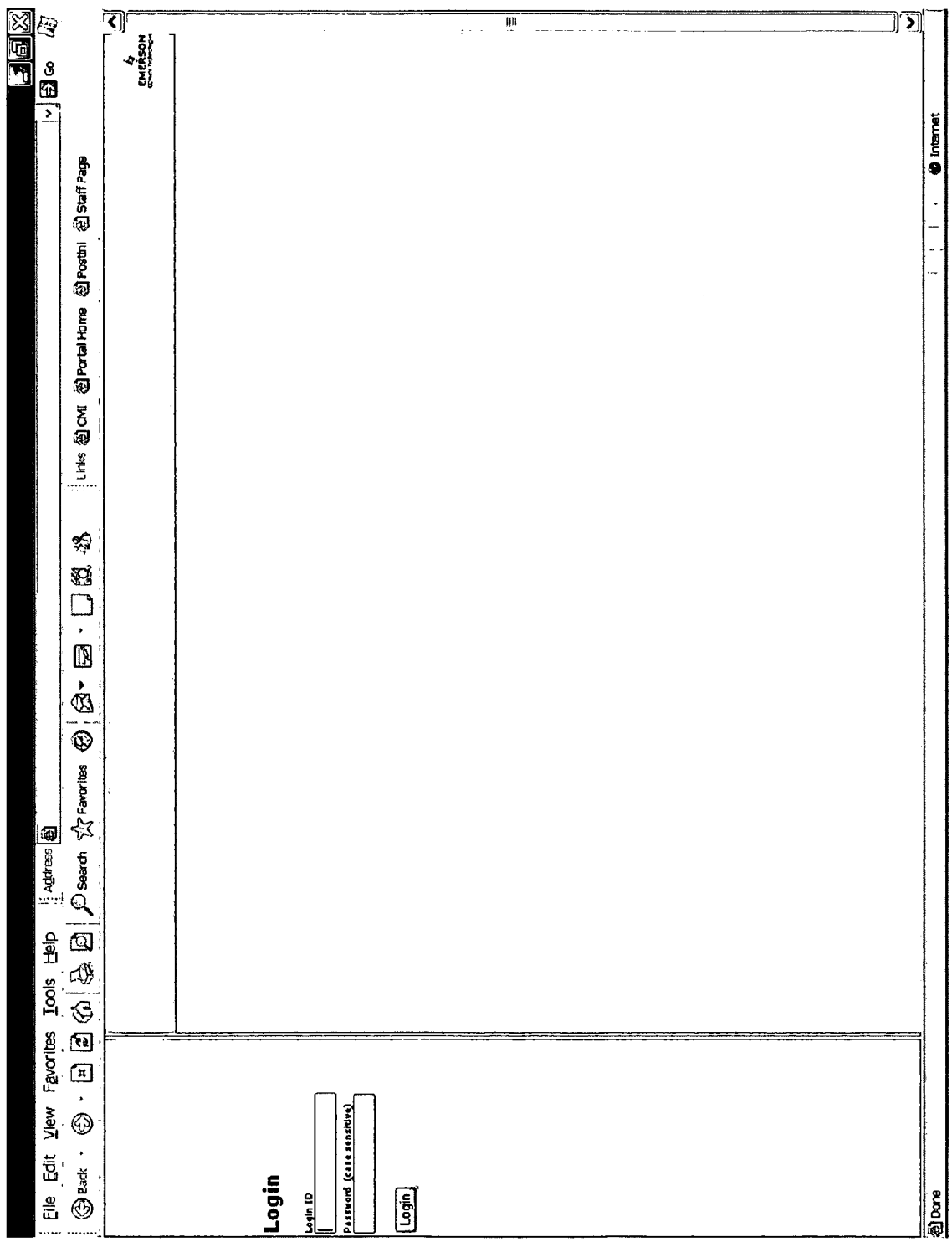
FIG. 12 is a screen shot of a login screen of an enterprise control and monitoring system.
Figure 13:
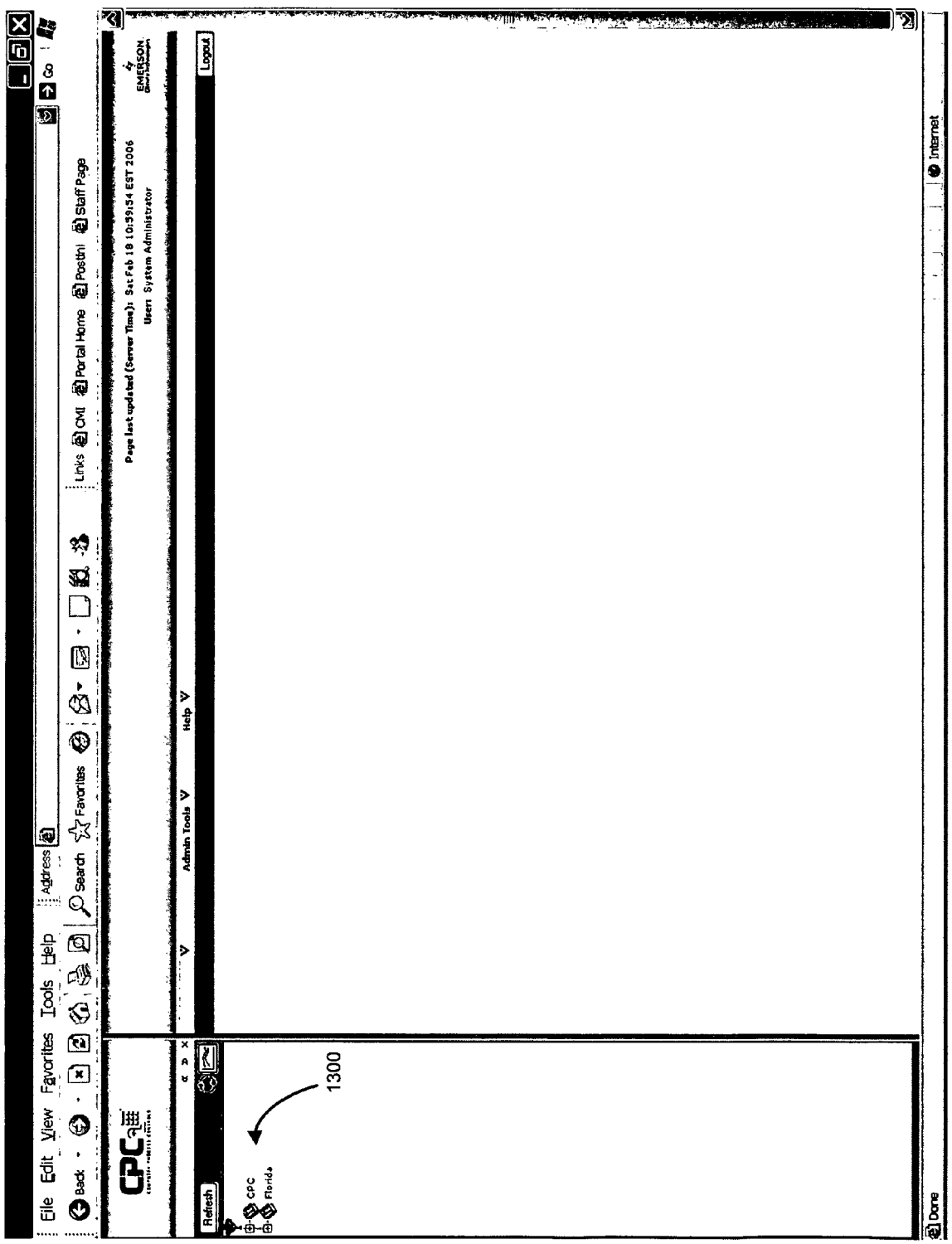
FIG. 13 is a screen shot of a navigational display of an enterprise control and monitoring system.
Figure 14:
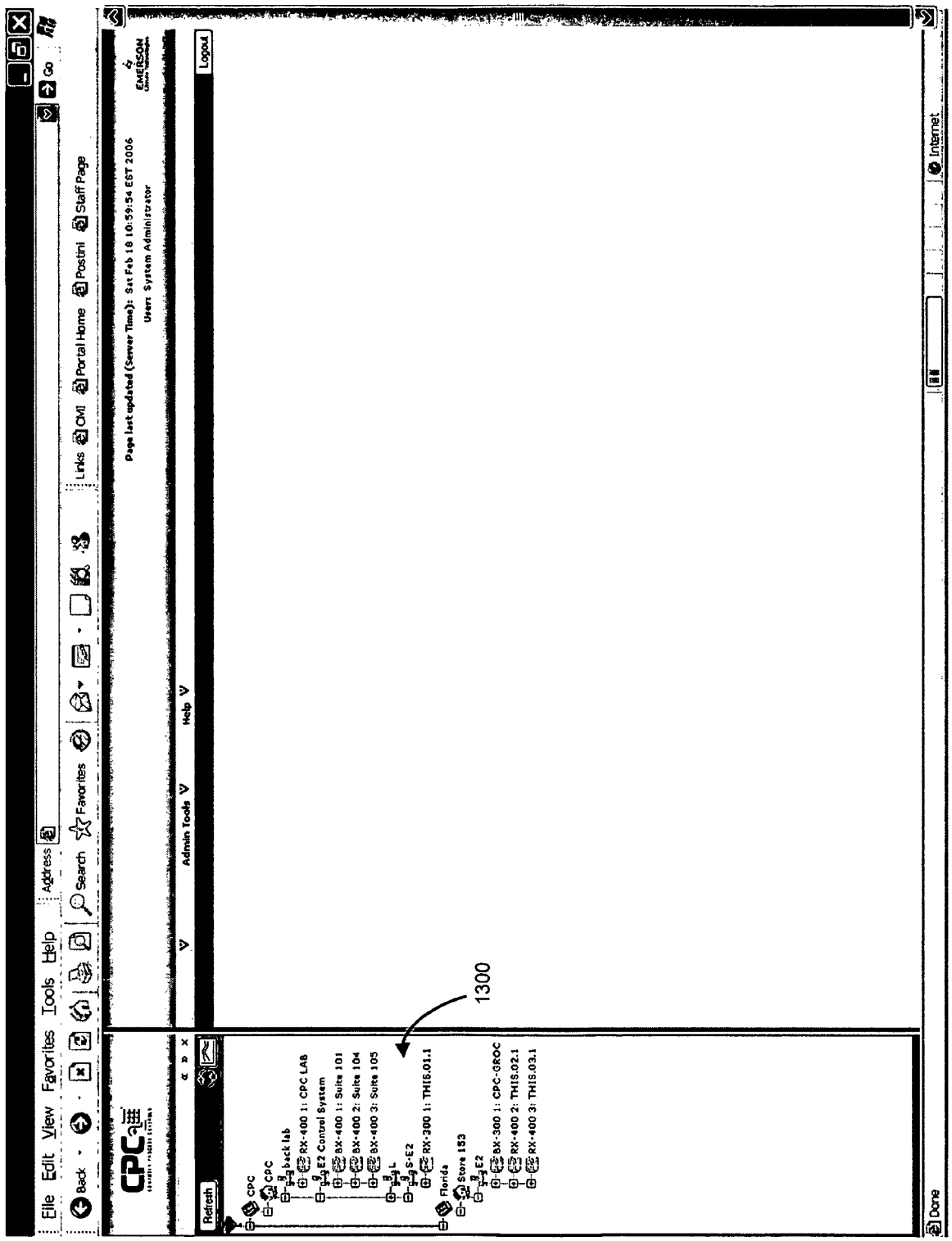
FIG. 14 is a screen shot of another navigational display of an enterprise control and monitoring system.
Figure 15:
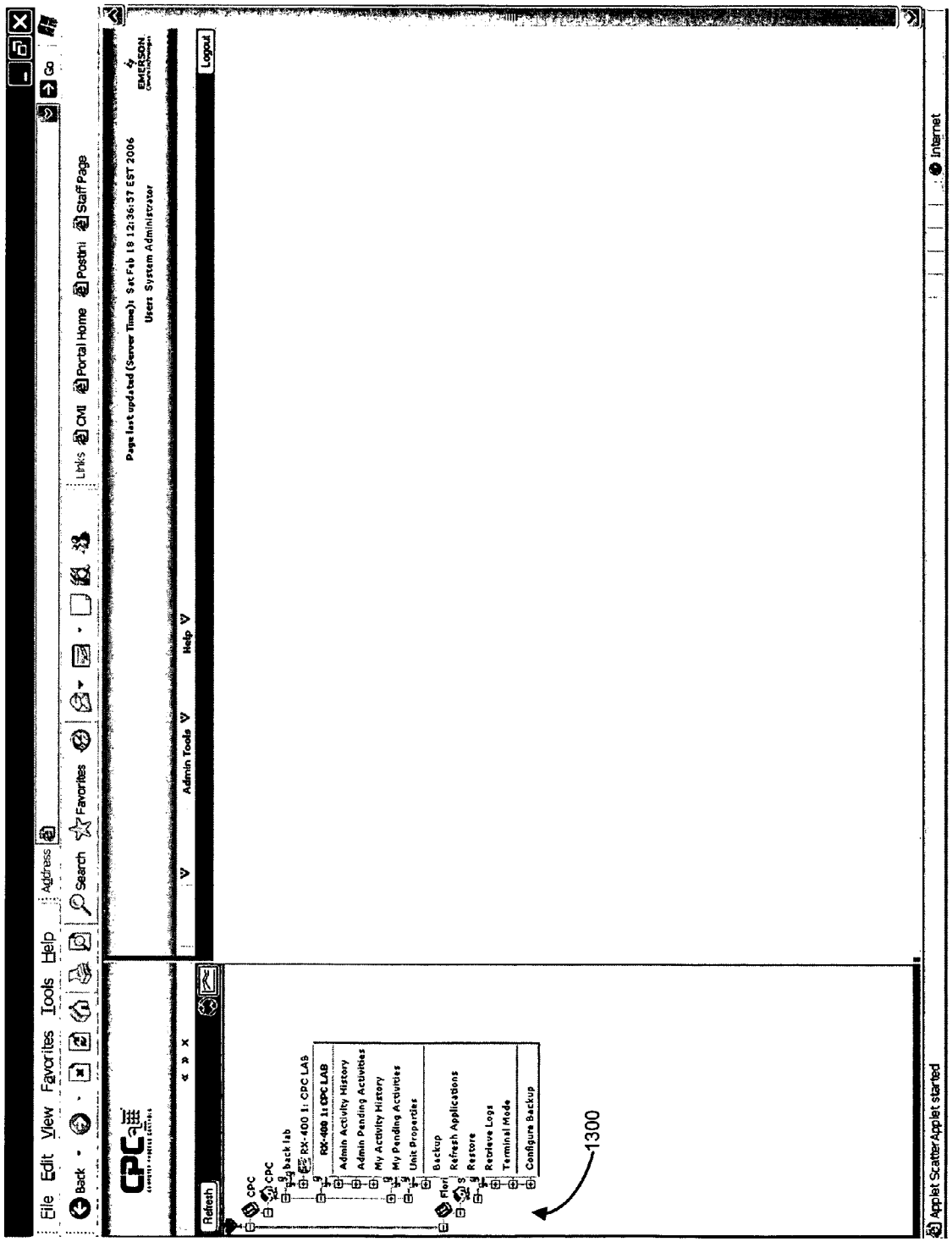
FIG. 15 is a screen shot of available options of a node of a navigational tree of a navigational display of an enterprise control and monitoring system.
Figure 16:
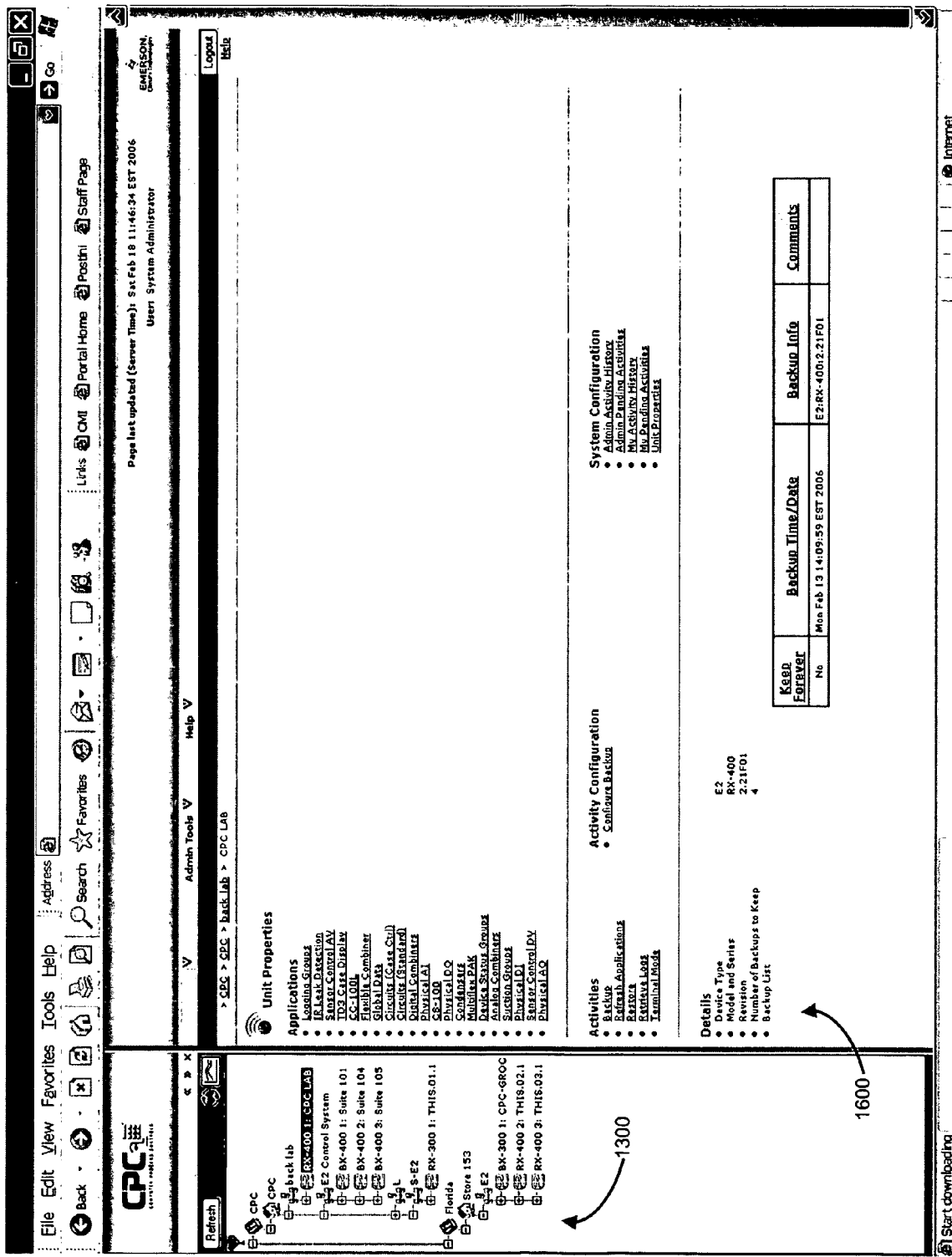
FIG. 16 is another screen shot of available options of a node of a navigational tree of a navigational display of an enterprise control and monitoring system.

In step 902, a user login may be received. The login screen is shown in FIG. 12. In step 904, a navigation tree may be loaded into the user interface, including the directories associated with the received user login. In FIG. 13, a navigation tree 1300 is shown with two directories: a directory labeled "CPC" and a directory labeled "Florida." Once the navigation tree 1300 has been loaded, user input is received in step 906.

The user may navigate the navigation tree 1300, or perform certain operations on a selected node of the navigation tree 1300. Navigation tree nodes may be directories, sites, control systems, controllers, or associated data points.

The user may make a navigation selection to expand or collapse a node in step 908. The user may make a node selection to retrieve and display available node data, activities, applications, and other data in step 910. The user may make an activity selection to perform a selected backup, refresh, restore, retrieve logs, send-to, or terminal mode activity in step 912. The user may make a data selection to display, graph, or export data in step 914. The user may make a configuration selection to configure system, users, groups, directories, sites, activities, etc., in step 916. After steps 908, 910, 912, 914, and 916, the algorithm loops back to step 906 to receive the next user input. Each of steps 908, 910, 912, 914, and 916 are described in turn below.

When a navigation selection is received, the selected node may be expanded or collapsed in step 908. The nodes of the navigation tree 1300 are displayed with either a "+" symbol or a "−" symbol. By selecting the "+" symbol, the associated node is expanded. By selecting the "−" symbol, the associated node is collapsed. For example, in FIG. 14, both the CPC and the Florida directories have been expanded. The CPC directory contains one site labeled CPC. The Florida directory contains one site labeled Store 153. The CPC site contains four control systems labeled: back lab, E2 Control System, L, and S-E2. The back lab control system contains one controller: RX-400 1: CPC LAB. The E2 Control System contains three controllers: BX-400 1: Suite 101, BX-400 2: Suite 104, and BX-400 3: Suite 105.

By right clicking on a particular node of the navigation tree 1300, the particular options and selections available for the selected node are shown. For example, in FIG. 15 the options and selections available for the "RX-400 1: CPC LAB" controller are shown in a drop down menu below the "RX-400 1: CPC LAB" node of the navigation tree 1300.

When a node is selected, the available node data, activities, applications, and other data, may be displayed in step 910. The main frame 1600 (to the right of the navigation frame) of the user interface may be populated with the available properties, activities, and other available options. For example, in FIG. 16 the "RX-400 1: CPC LAB" controller is selected and the unit properties, activities, activity configuration, system configurations, details, and backup data are loaded into the main frame to the right of the navigation tree.

The "Applications" displayed are dictated by the selected controller and generally correspond to groupings of variables or operating parameters that are sensed or calculated by the controller. For example, the "RX-400 1: CPC LAB" controller has an application labeled "Condensers." The variables and operating parameters associated with each of the condensers controlled by the "RX-400 1: CPC LAB" controller are grouped under the "Condensers" application.

The "Activities" that are displayed correspond to the activities that may be performed. For example, in FIG. 16 the listed activities include: Backup, Refresh Applications, Restore, Retrieve Logs, and Terminal Mode. The displayed activities correspond to activities that are allowed based on the user login. User access privileges, determined by an administrator, determine the activities that are allowed to be performed by a given user.

Figures 10A, 10B:
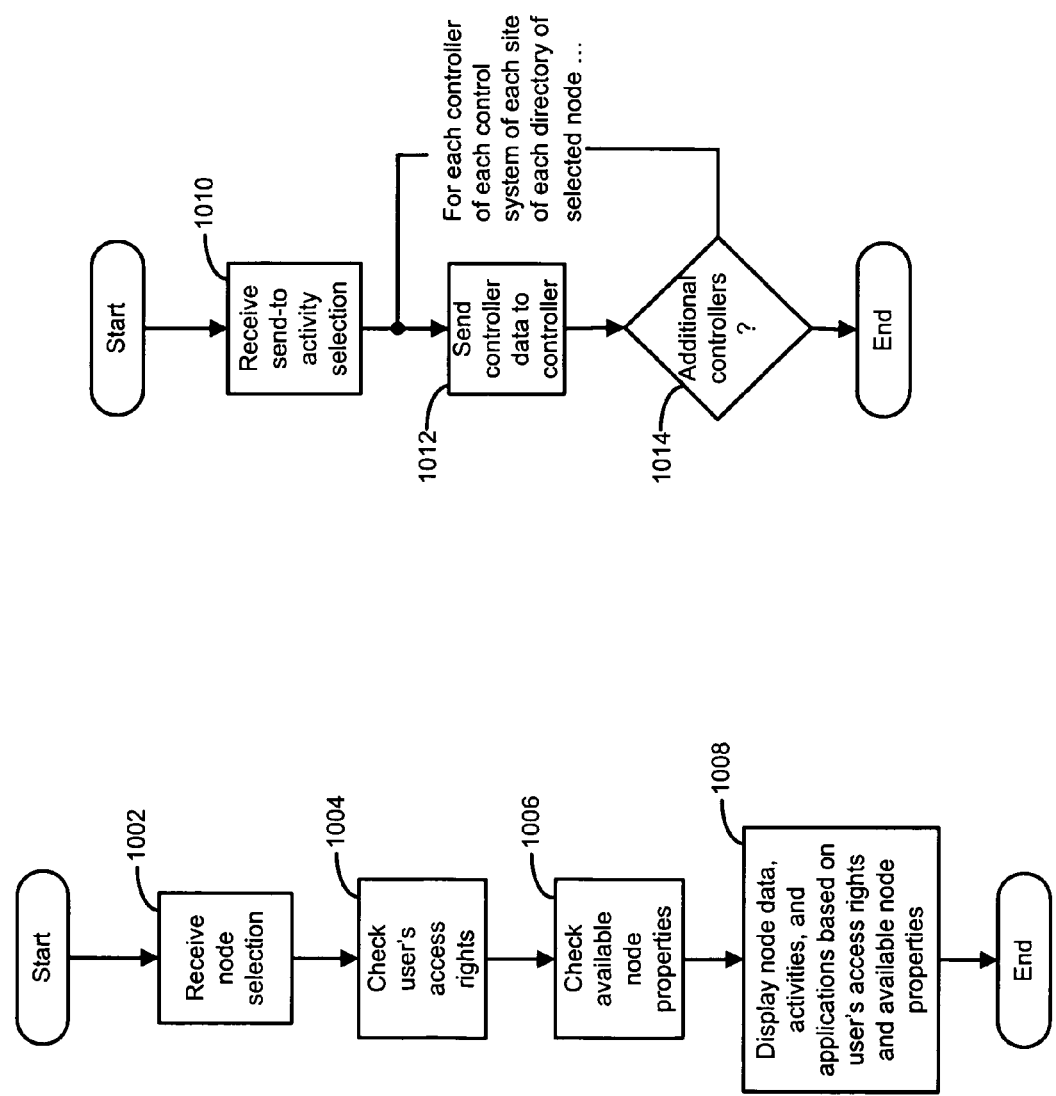
FIG. 10A is a flow chart for displaying node data, activities, and applications in an enterprise control and monitoring system.
FIG. 10B is a flow chart for performing a send-to activity in an enterprise control and monitoring system.

With reference to FIG. 10A, a node display algorithm is shown. The node display algorithm may be executed by either the Server or the client software. In step 1002, a node selection may be received. In step 1004, the user's access rights may be checked based on the user login. In step 1006, the available node properties may be checked. When the node to be displayed is a controller, the server may query the controller to determine the applications and data available for display. In step 1008, the node data, activities, and applications are displayed based on the user's access rights and the available node properties.

Referring again to FIG. 9, when an activity is selected, the activity is performed in step 912. When an activity is to be performed on a selected node of the navigation tree 1300, the activity is performed on all of the nodes contained within, or below, the selected node. In this way, when an activity is to be performed on a directory, the activity is performed on all of the directories, sites, control systems, and controllers contained within the selected directory.

The activities may be performed by the server 102 based on instructions received from the client 108. For this reason, after initiating the activity, the user may move on to perform another operation while the server 102 performs the activity in the background. The user may check the status of pending activities by clicking on "My Pending Activities."

Figure 17:
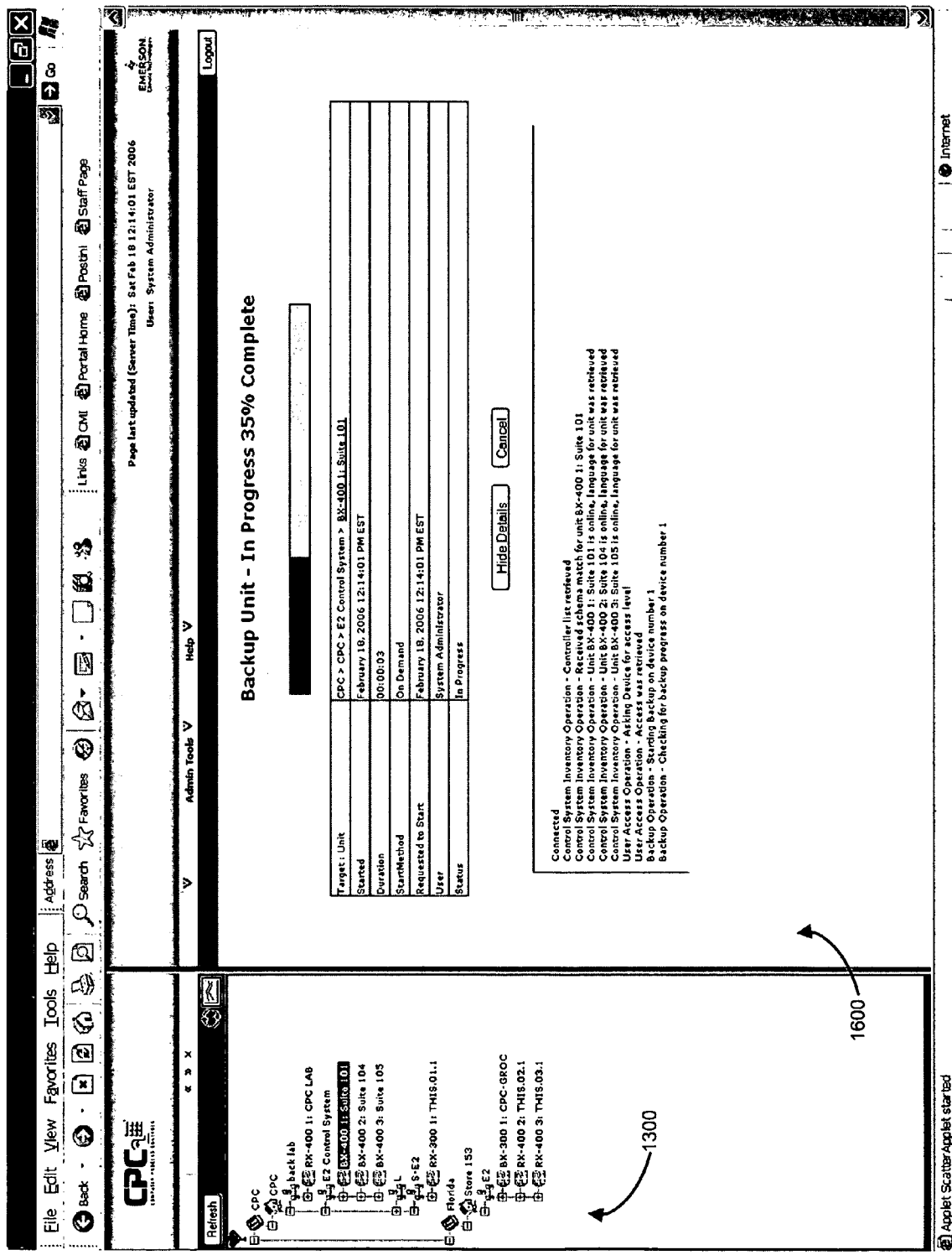
FIG. 17 is a screen shot of a backup activity of an enterprise control and monitoring system.

When a "backup activity" is selected, the operating data and operating parameters for all the controllers within the selected node may be retrieved and stored as back up copies in the database 106. The progress of the backup activity is displayed in the main frame, as shown in FIG. 17.

Figures 11A, 11B, 11C:
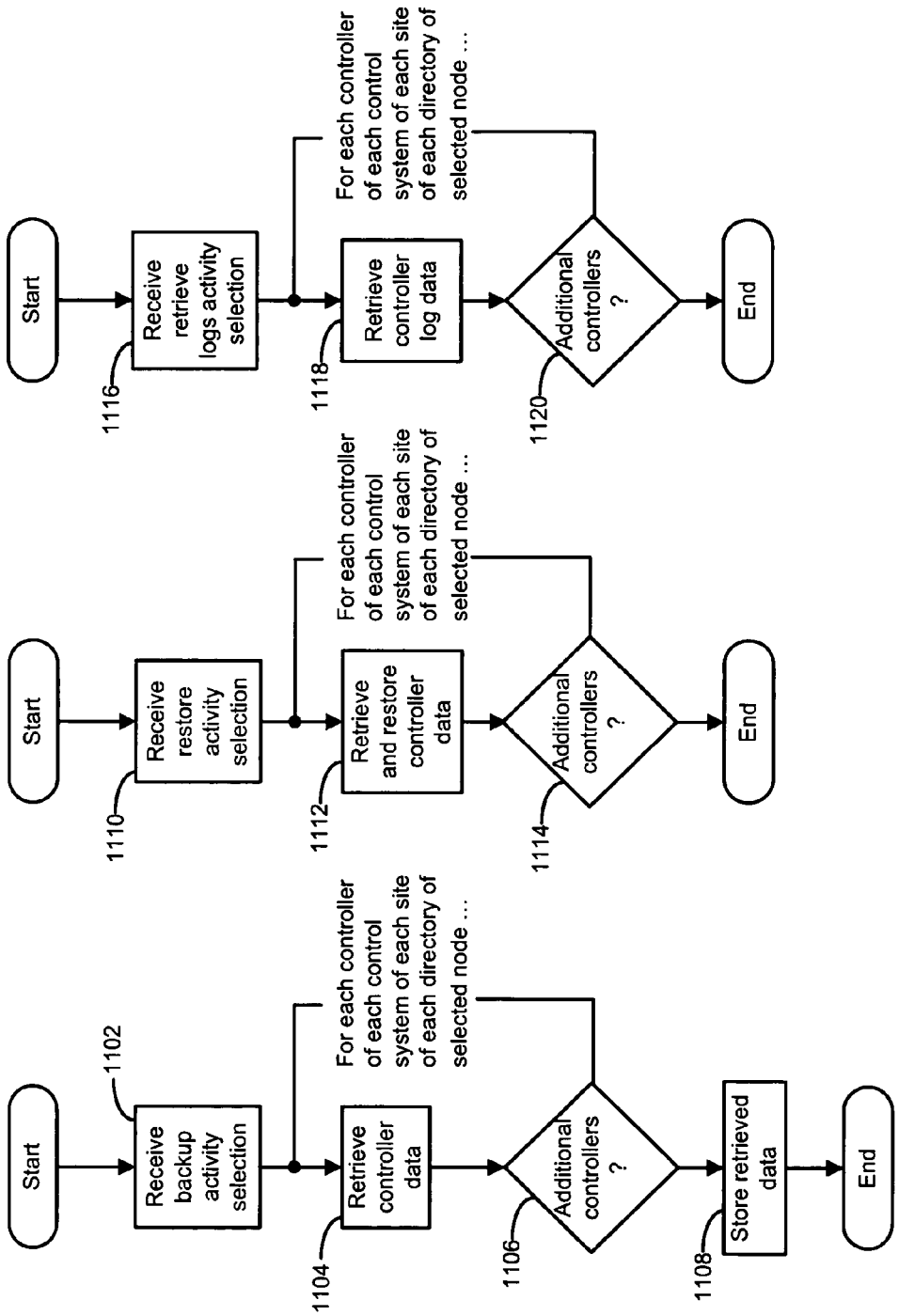
FIG. 11A is a flow chart for performing a backup activity in an enterprise control and monitoring system.
FIG. 11B is a flow chart for performing a restore activity in an enterprise control and monitoring system.
FIG. 11C is a flow chart for performing a retrieve log data activity in an enterprise control and monitoring system.

As shown in FIG. 11A, a backup algorithm may be executed by the server 102. The backup activity selection may be received in step 1102. In step 1104, controller data may be retrieved. In step 1106, the server 102 checks for additional controllers 104 within the selected node of the navigation tree 1300. Steps 1104 and 1102 may be repeated for each controller 104 of each control system 128 of each site 130 of each directory of the selected node of the navigation tree 1300. When no additional controllers 104 remain, the retrieved data is stored in the database 106 in step 1108. In this way, all of the operating data and operating parameters for the controllers 104 in the selected group are backed up to the database 106. Multiple controllers 104 may be backed up in response to a single received instruction from the user operating the client 108.

Referring again to FIG. 9, the user may select a refresh activity in step 912. When refresh is selected, the current display may be updated to reflect any changes in the currently selected node of the navigation tree 1300. The refresh activity may be performed according to the node display algorithm described above with reference to FIG. 10A.

The user may select a restore activity in step 912. The restore activity may retrieve backup data from the database 106 and restore the backup data to the selected controllers 104. As shown in FIG. 11B, a restore algorithm may be executed by the server. In step 1110, the restore activity selection is received. In step 1112, the controller data may be retrieved from the database 106 and restored to the controller memory. In step 1114, the server 102 may check for additional controllers 104 within the selected node of the navigation tree 1300. Steps 1112 and 1114 may be repeated for each controller 104 of each control system 128 of each site 130 of each directory of the selected node of the navigation tree 1300. When no additional controllers 104 remain, the algorithm ends. In this way, multiple controllers 104 may be restored in response to a single received instruction from a user operating the client 108.

The user may select a retrieve logs activity in step 912. The retrieve logs activity may retrieve updated log data from the controllers 104 within the selected node of the navigation tree 1300 for use and display by the server 102 and client 108. As shown in FIG. 11C, a retrieve logs algorithm may be executed by the server 102. In step 1116, the retrieve logs activity selection may be received. In step 1118, the controller log data may be retrieved from the controller 104 for use by the server 102 and client 108. In step 1120, the server 102 checks for additional controllers 104 within the selected node of the navigation tree 1300. Steps 1118 and 1120 may be repeated for each controller 104 of each control system 128 of each site 130 of each directory of the selected node of the navigation tree 1300. When no additional controllers 104 remain, the algorithm ends. In this way, log data from multiple controllers 104 may be retrieved in response to a single received instruction from a user operating the client 108.

The user may select a send-to activity in step 912. The send-to activity may send a data update or modification to all the controllers 104 within the selected node of the navigation tree 1300. A user may want to change an operating parameter across multiple controllers 104, control systems 128, sites 130, or directories. For example, controllers 104 may be configured with a "closing time" operating parameter. At the specified closing time, the controllers 104 may turn off the lights, lower HVAC heating set point temperature, or raise the HVAC cooling set point temperature, etc. A retailer may want to change the closing time across all retail locations. During a holiday season, the retailer may decide to stay open two hours later. By using the send-to activity, the retailer may simply enter the new closing time, and perform a send-to activity to send the later closing time to all of the controllers 104 selected by the retailer. The new closing time will be "broadcast" to all controllers 104 within the selected node of the navigation tree 1300.

Referring now to FIG. 10B, a send-to algorithm may be executed by the server. In step 1010, the send-to activity selection may be received with the specified new data to be sent. In step 1012, the controller data may be sent to the controller 104. In step 1014, the server 102 may check for additional controllers 104 within the selected node of the navigation tree 1300. Steps 1012 and 1014 may be repeated for each controller 104 of each control system 128 of each site 130 of each directory of the selected node of the navigation tree 1300. When no additional controllers 104 remain, the algorithm ends. In this way, updated controller data may be sent to multiple controllers 104 in response to a single received instruction from a user operating the client 108.

Figure 18:
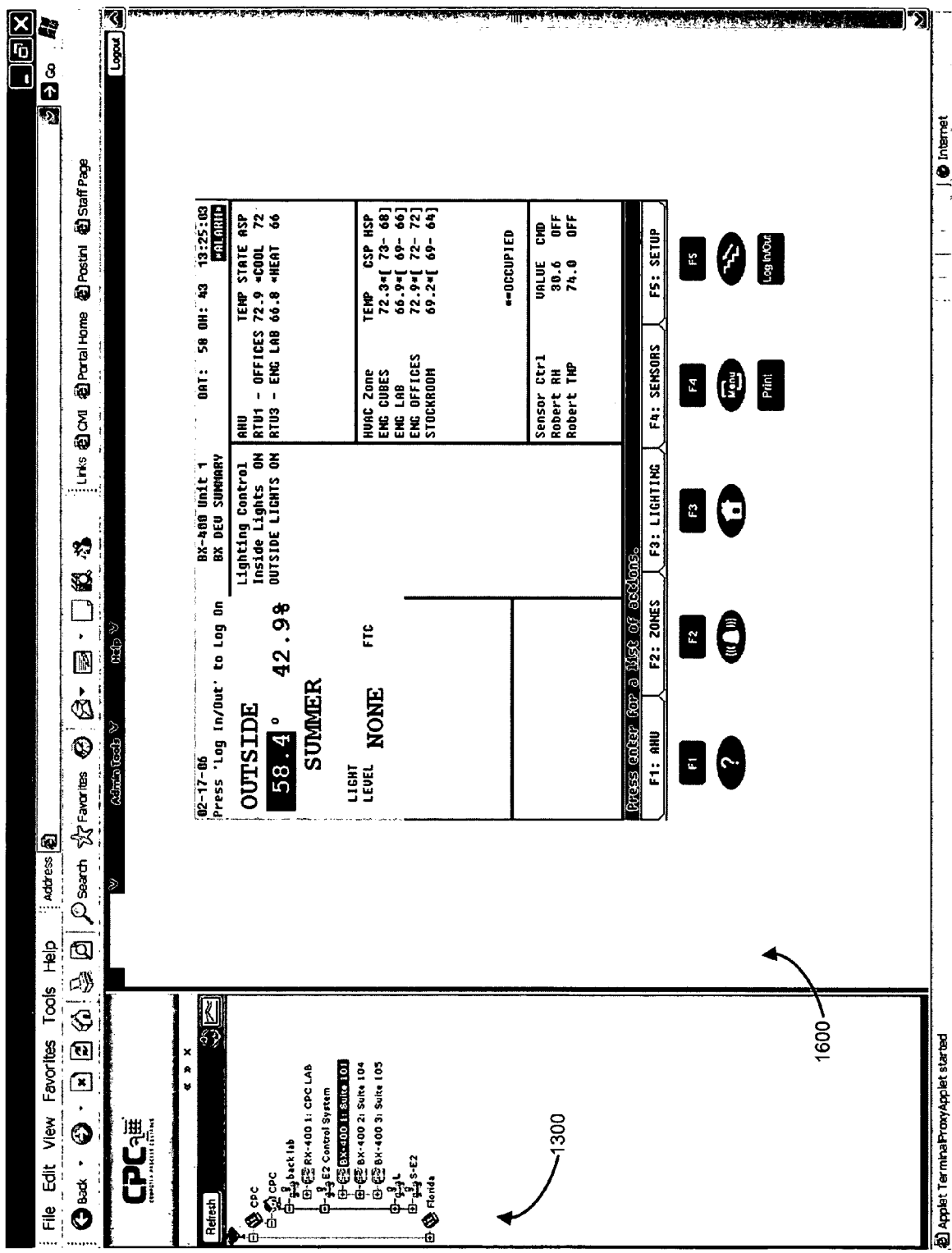
FIG. 18 is a screen shot of a terminal mode of an enterprise control and monitoring system.
Figure 19:
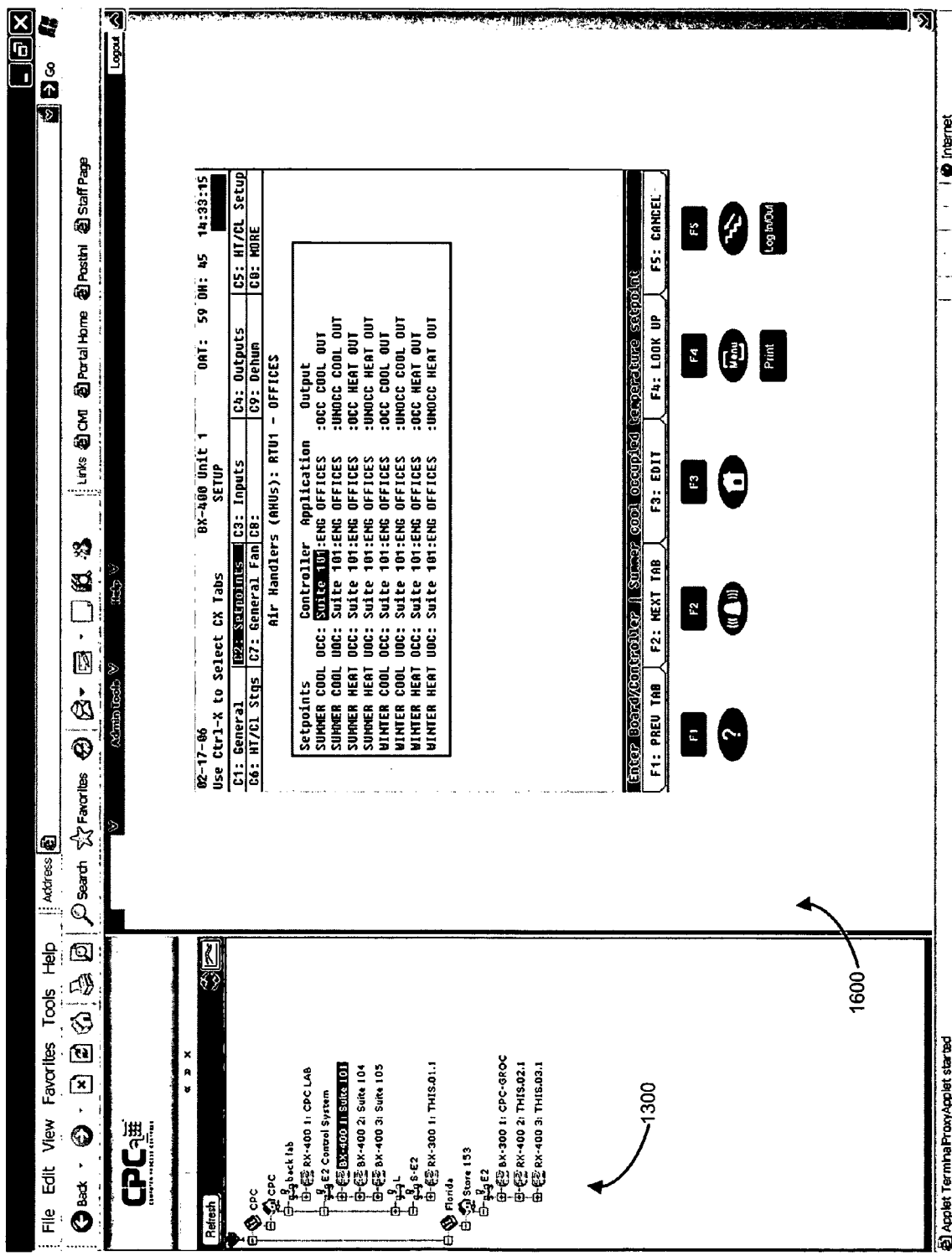
FIG. 19 is another screen shot of a terminal mode of an enterprise control and monitoring system.
Figure 20:
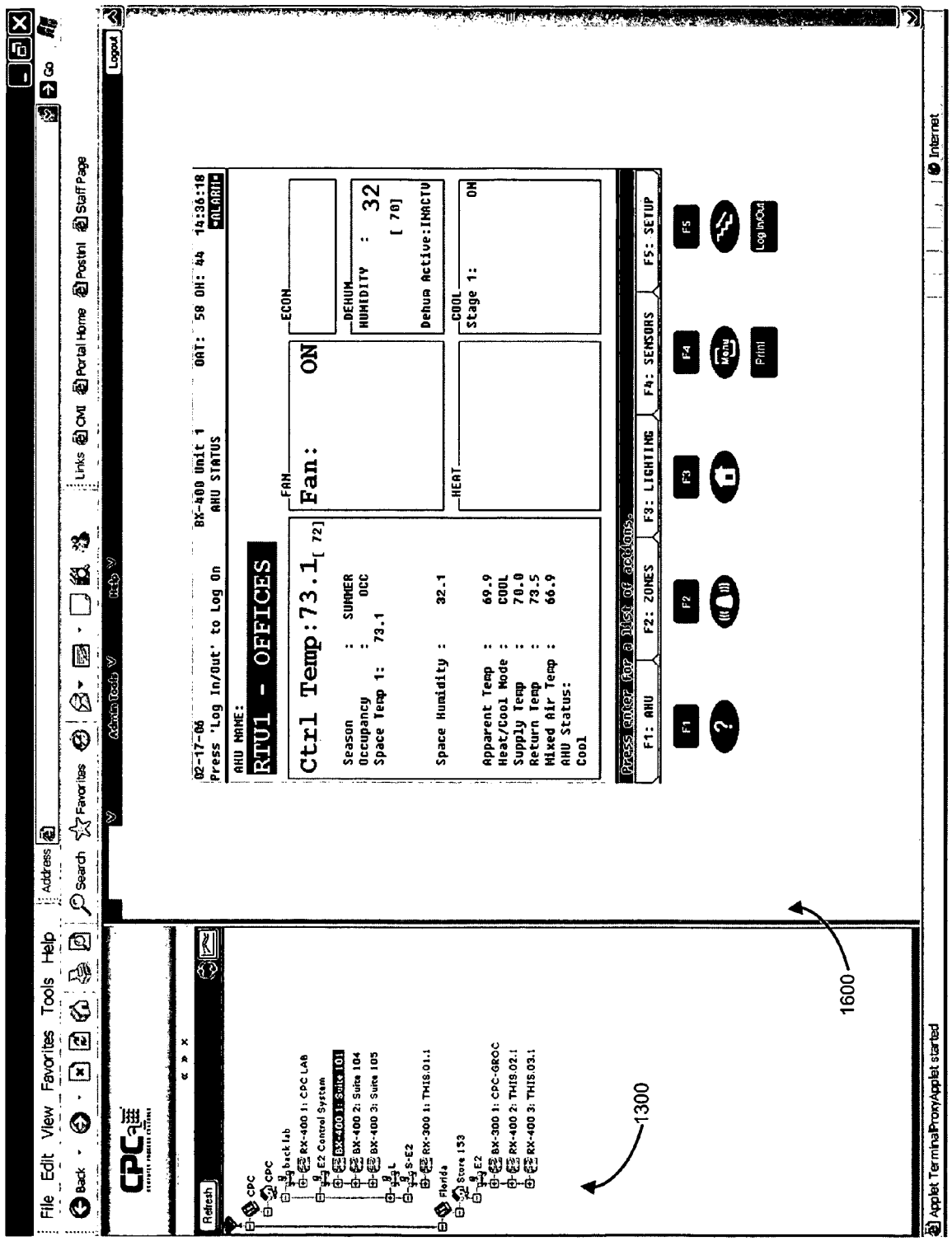
FIG. 20 is another screen shot of a terminal mode of an enterprise control and monitoring system.
Figure 21:
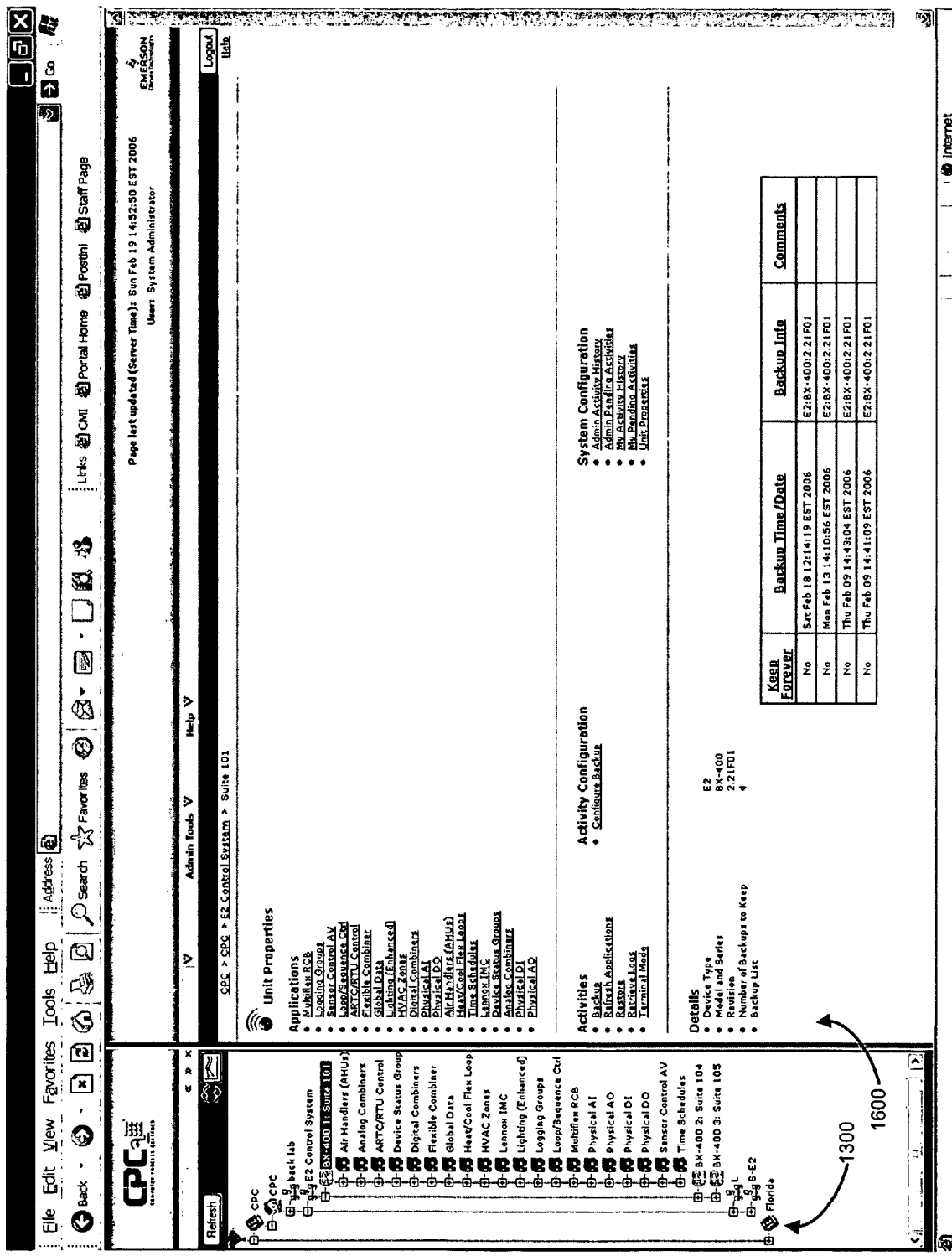
FIG. 21 is a screen shot of an expanded node of a navigational tree of a navigational display of an enterprise control and monitoring system.

Referring again to FIG. 9, the user may select terminal mode in step 912. In terminal mode, a display of the selected controller 104 may be loaded in the main frame 1600 of the user interface as shown in FIGS. 18-20. Terminal Mode may be initiated by selecting Terminal Mode from the Activities list. In Terminal Mode, the controller display may be seen in the user interface exactly as it appears on the display monitor of the controller itself. User input may be sent directly to the controller 104. In this way, a user operating the client 108 may view the controller display as if the user were directly in front of the terminal. User keyboard input received by the client 108 may be sent to the controller 104 which responds in the same way as if the user were entering the keyboard input directly on the keyboard of the controller 104 itself.

Referring to FIG. 18, a terminal mode display for an HVAC and lighting controller is shown. The outside temperature, the light status, and roof top unit (RTU) status are displayed. Referring to FIG. 19, a setpoint modification screen is shown in terminal mode for an HVAC and lighting controller. Referring to FIG. 20, a RTU status screen is displayed in terminal mode for an HVAC and lighting controller. By pressing the appropriate functions keys, such as F1, F2, F3, and F4, the controller menu screens may be navigated.

Figure 22:
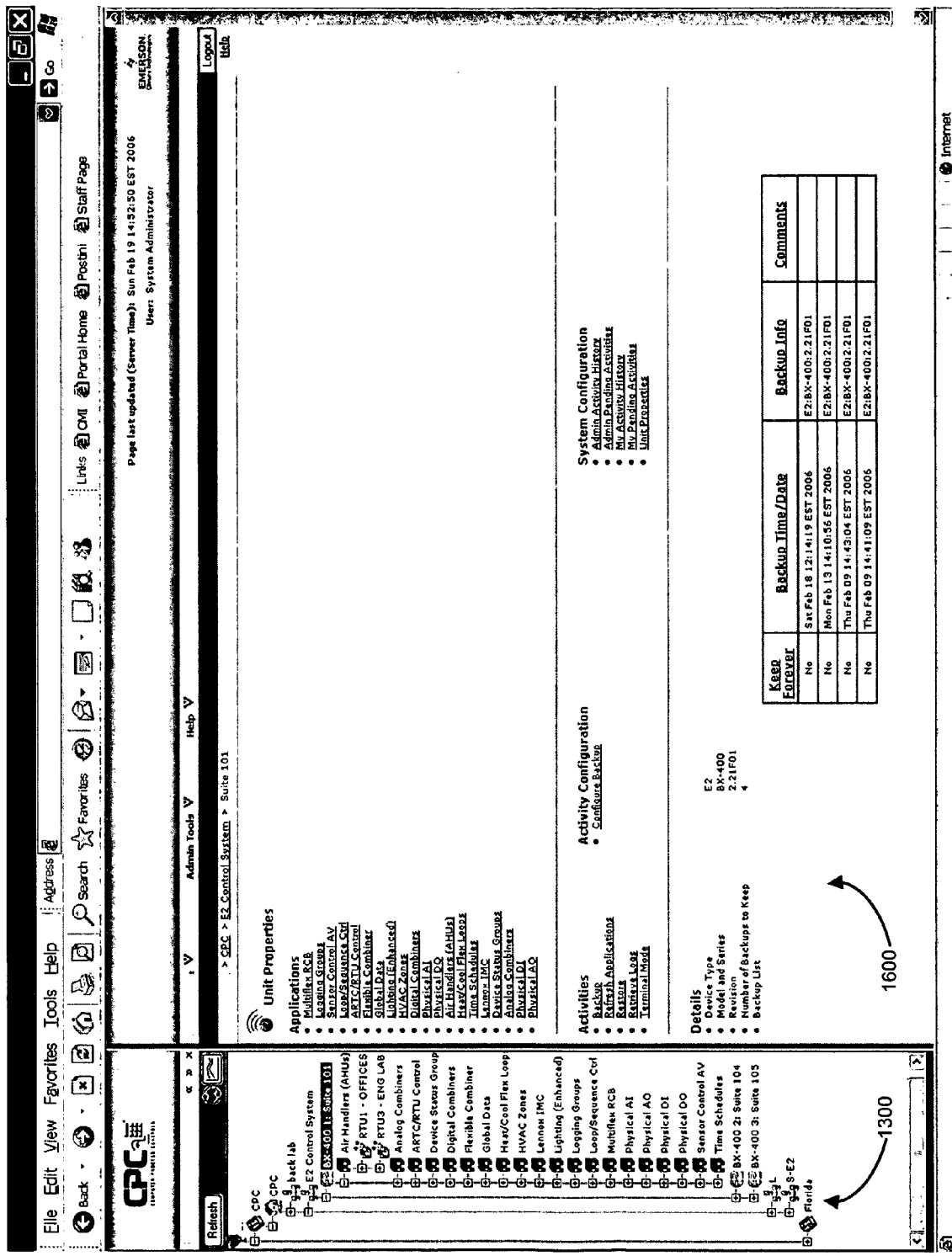
FIG. 22 is another screen shot of an expanded node of a navigational tree of a navigational display of an enterprise control and monitoring system.

Referring again to FIG. 9, the user may make a data selection to display, graph, or export data in step 914. Referring now to FIGS. 21-24, screen shots associated with a data selection are shown. For example, in FIG. 21, the BX-400 1: Suite 101 controller (in the E2 Control System, CPC site and CPC directory), has been expanded. The applications associated with the controller are displayed indented below the controller. In FIG. 22, the first application under the controller, the Air Handlers (AHUs) has been expanded. Under the AHU's, two RTU's are displayed: RTU1—OFFICES and RTU3—ENG LAB.

Figure 23:
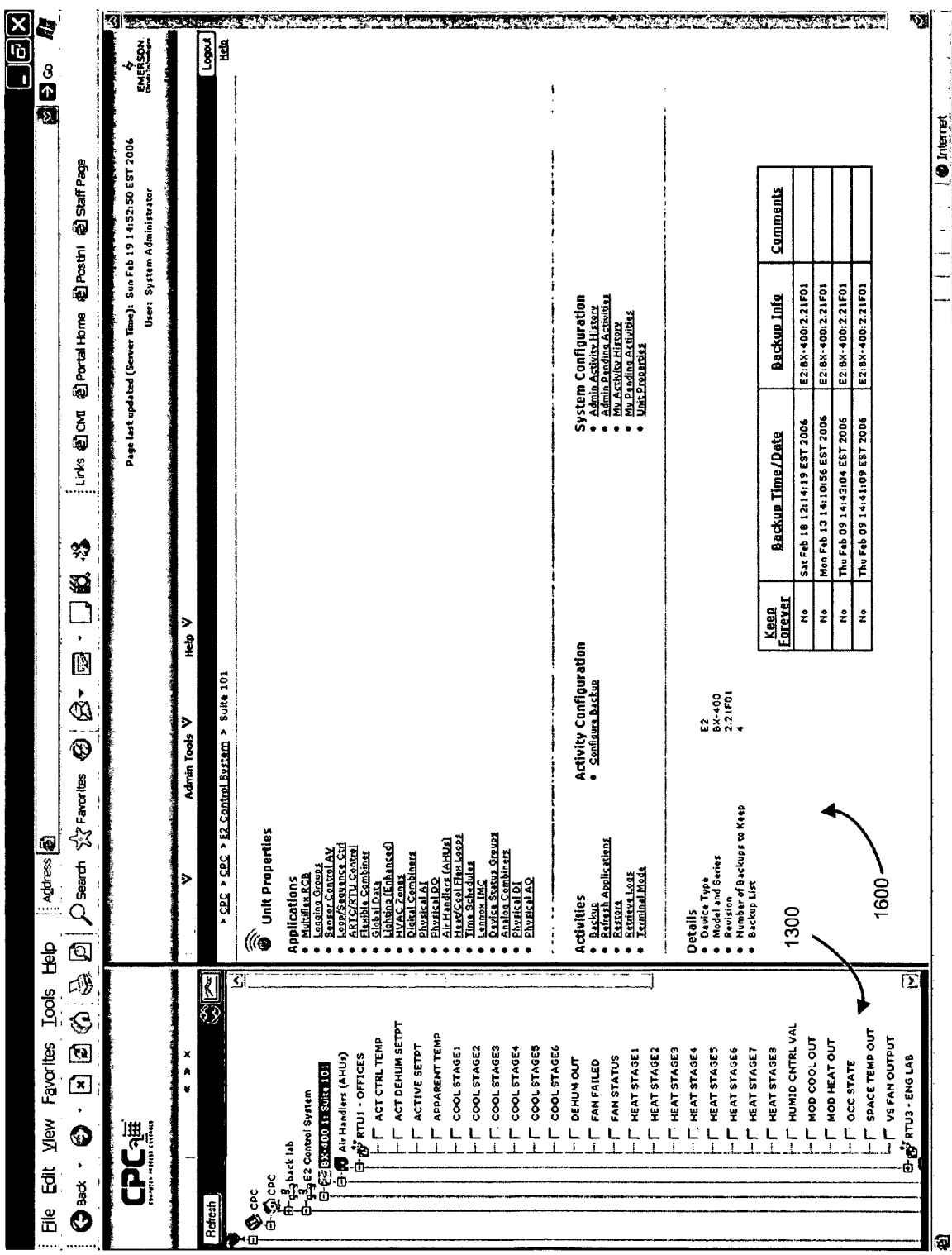
FIG. 23 is a screen shot of available data points of an expanded node of a navigational tree of a navigational display of an enterprise control and monitoring system.
Figure 24:
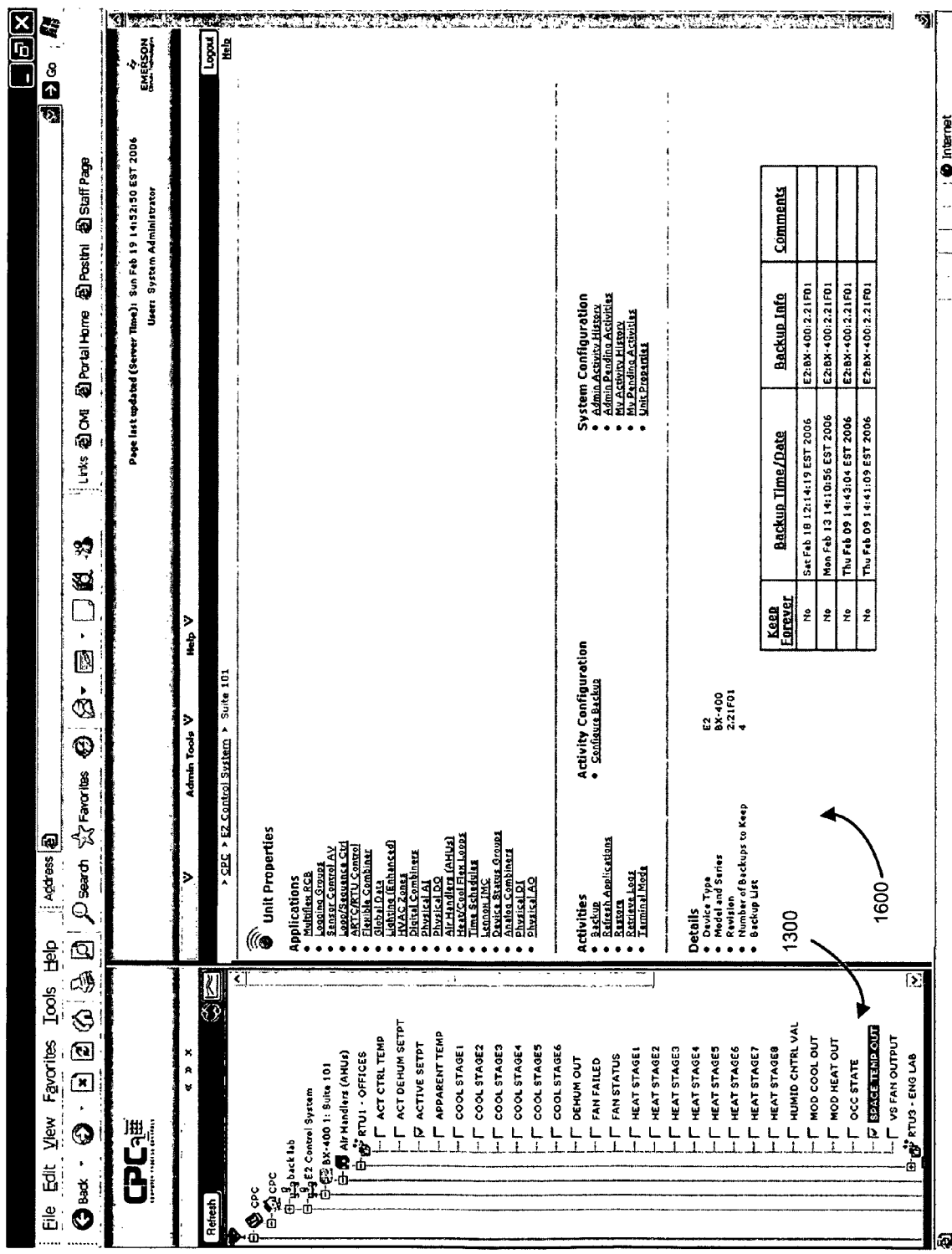
FIG. 24 is a screen shot of selected data points of an expanded node of a navigational tree of a navigational display of an enterprise control and monitoring system.
Figure 25:
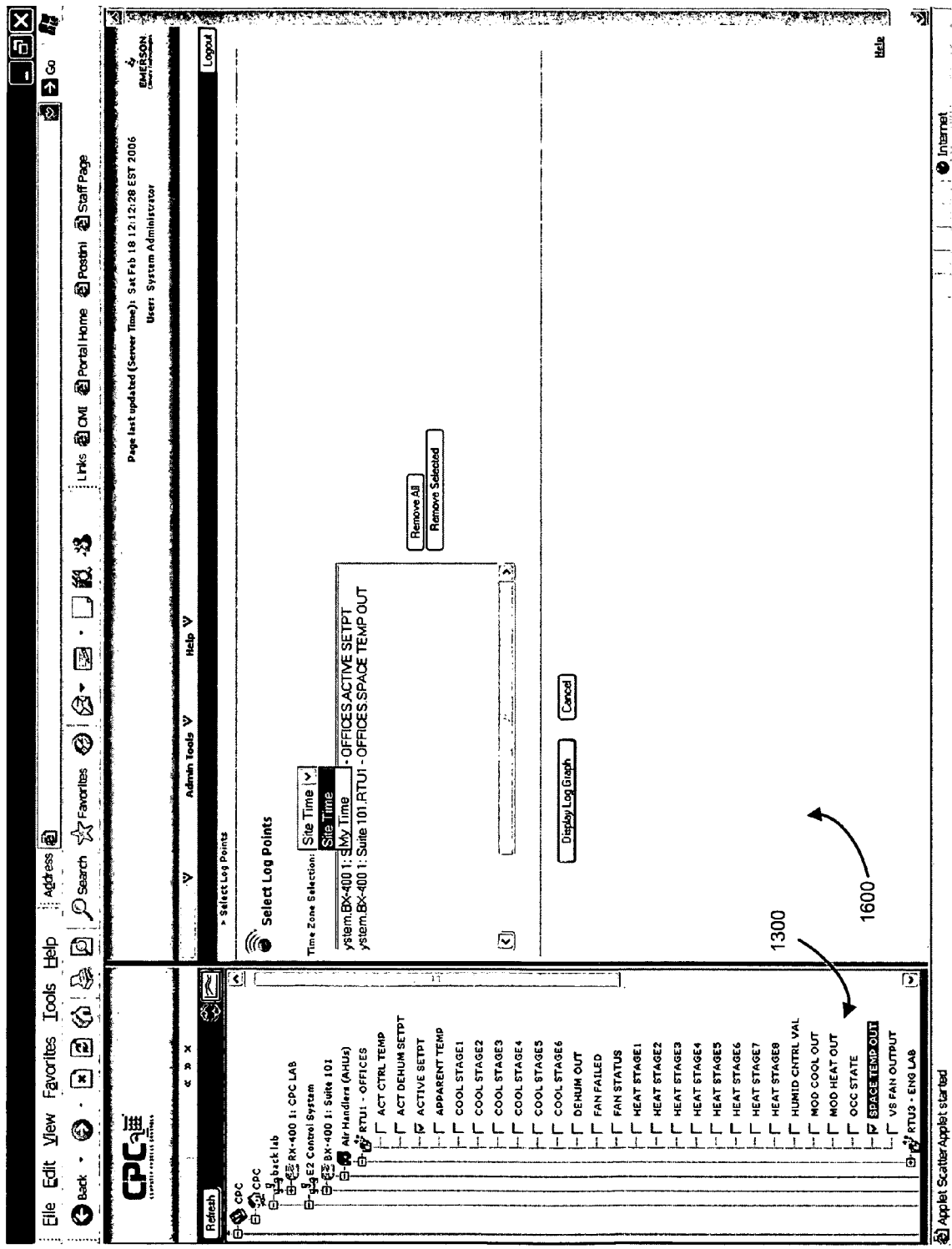
FIG. 25 is another screen shot of selected data points of an expanded node of a navigational tree of a navigational display of an enterprise control and monitoring system.

In FIG. 23, the RTU1—OFFICES node has been expanded to reveal the data fields associated with RTU1—OFFICES. In FIG. 24, two data fields are selected: ACTIVE SETPT and SPACE TEMP OUT. By selecting the graph button in the navigation frame, a log points display window may be shown in the main frame, as in FIG. 25. The log points display window shows the current data points selected for graphing.

In addition, the log points display window provides for a time zone selection. The time zone selection may be set to "Site Time" or "My Time." When viewing data points for different controllers in different time zones, or when viewing data points for a controller in a time zone different than the user time zone, the time zone selection determines which time zone to use. For example, the user may be in the Eastern Time zone and viewing data points from controllers in the Central and Pacific Time zones. By selecting "My Time," all of the data points may be displayed according to the Eastern Time zone. By selecting "Site Time" the Central Time zone may be used for the data points of the controller in the Central Time zone and the Pacific Time zone may be used for the data points of the controller in the Pacific Time zone. When the time zone is selected, the user may select "Display Log Graph."

Figure 26:
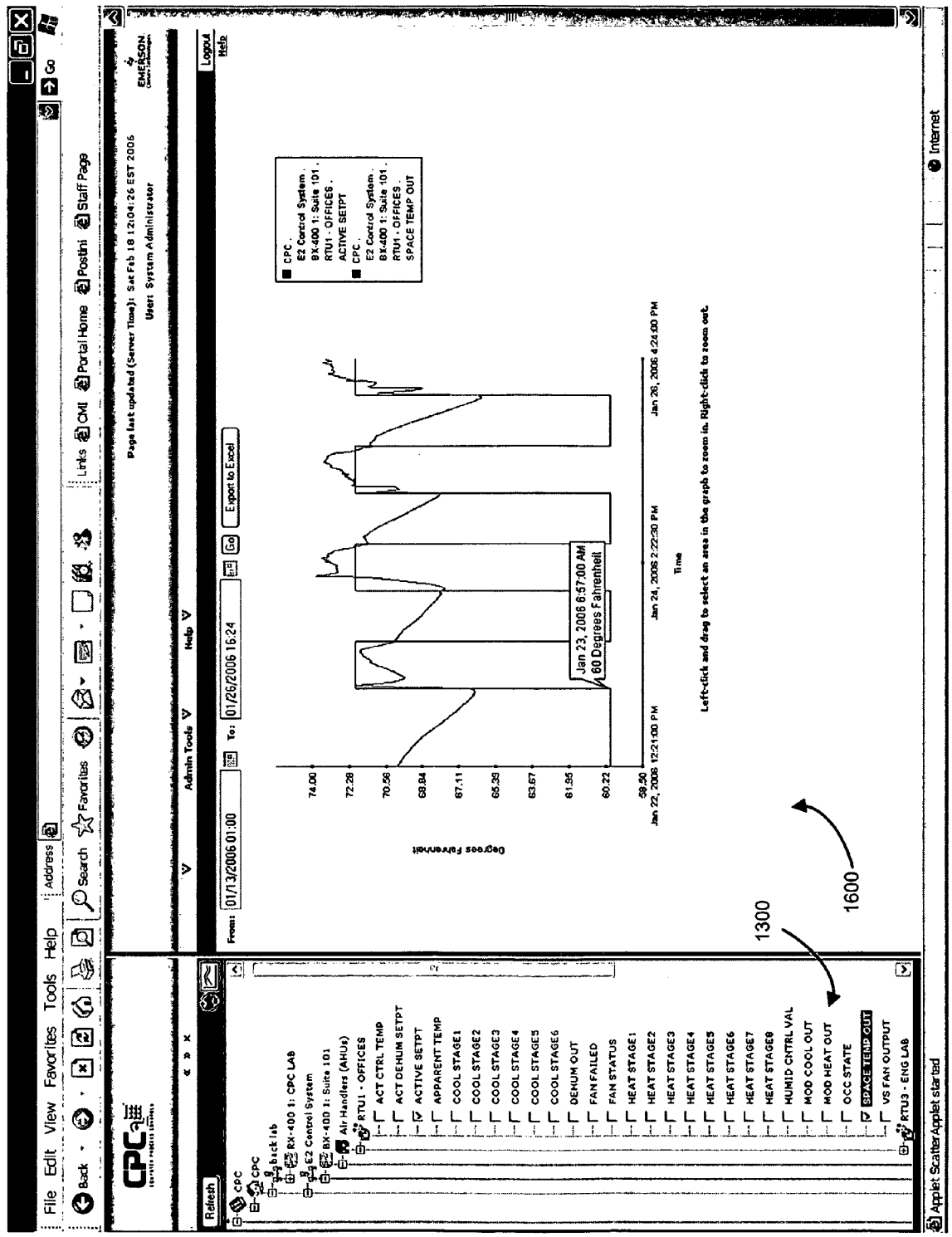
FIG. 26 is a screen shot of a graph of selected data points of an expanded node of a navigational tree of a navigational display of an enterprise control and monitoring system.

The graph of the log points is shown in FIG. 26. The set point data of the AHU is displayed with the space temperature. As can be seen from the graph, the set point is lowered to 60 degrees between 11:00 p.m. and 7:00 a.m. Between 7:00 a.m. and 11:00 p.m., the set point is raised to 72 degrees. As displayed by the graph, the space temperature decreases when the set point is lowered, and increases when the set point is raised.

Figure 27:
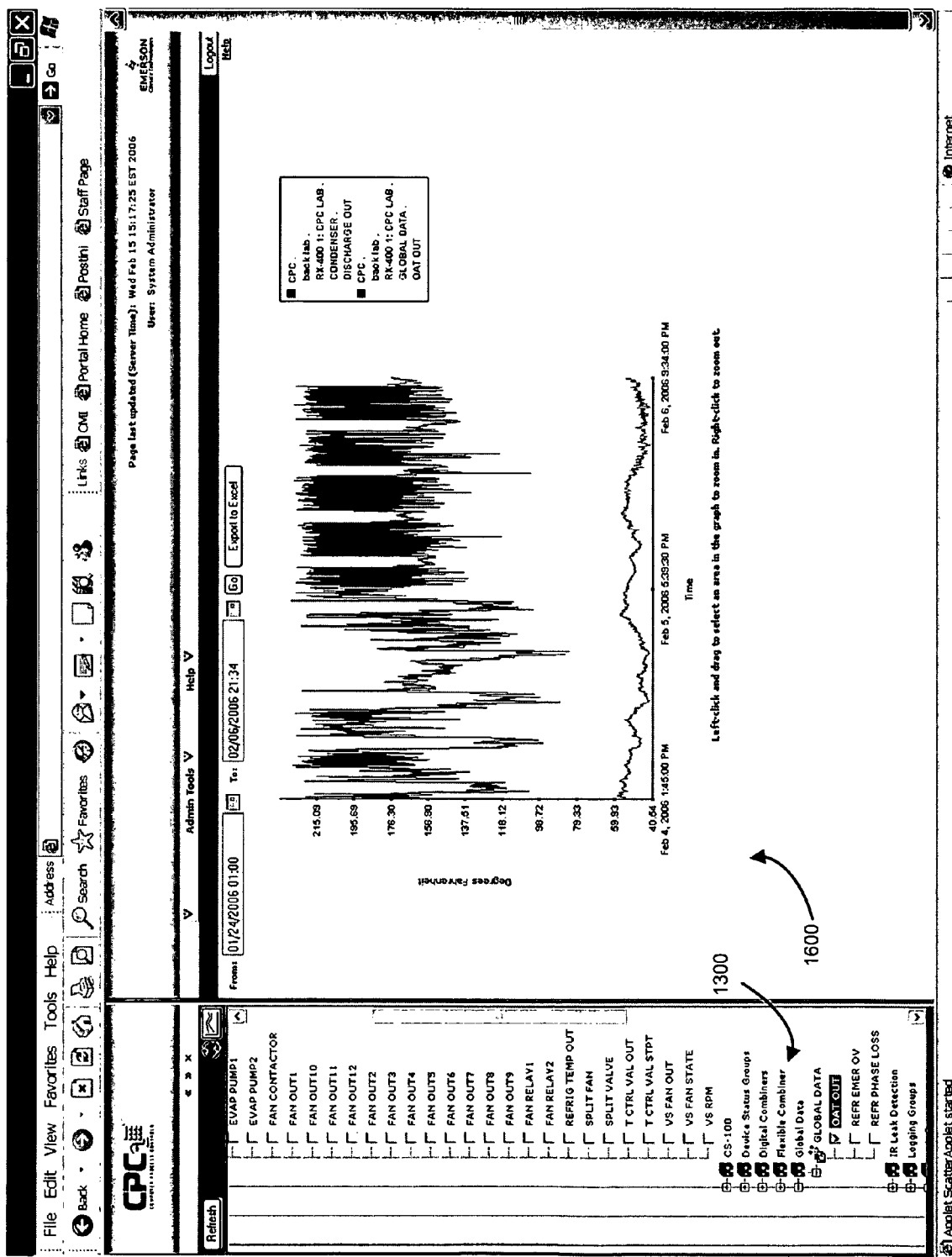
FIG. 27 is another screen shot of a graph of selected data points of an expanded node of a navigational tree of a navigational display of an enterprise control and monitoring system.

Another log point graph is shown in FIG. 27. In this case, data associated with a condenser application is shown. The condenser discharge temperature is displayed with outside ambient temperature. As shown in FIG. 27, outside temperature ("OAT OUT") is classified as "Global Data." Global data refers to data that is shared across controllers. It would not be economical for each controller to have its own outside temperature sensor. Thus, one controller is configured with an outside temperature sensor. The outside temperature is then designated as "Global Data" during configuration of the controller. The controller may then share the sensed outside temperature with other connected controllers.

Figure 28:
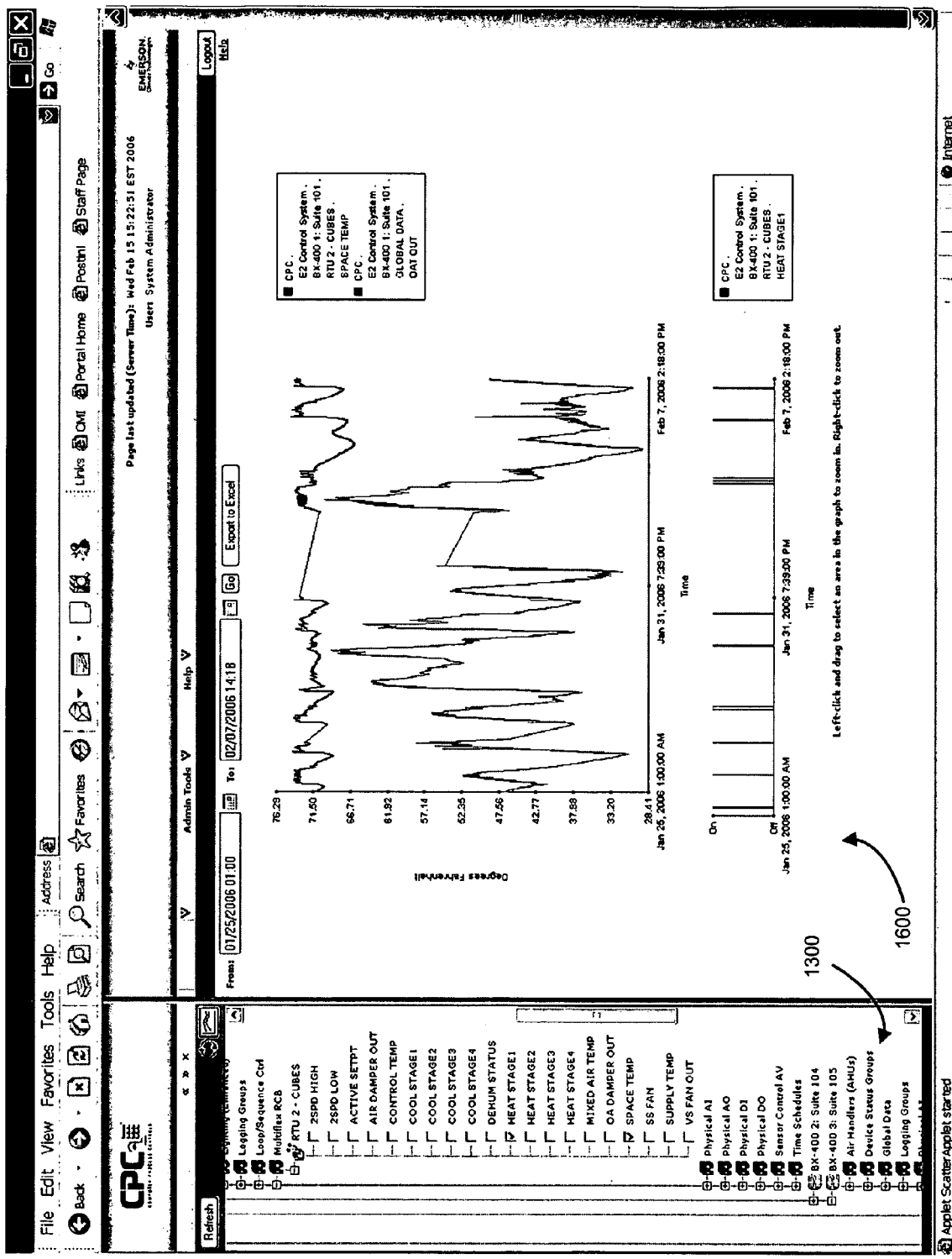
FIG. 28 is another screen shot of a graph of selected data points of an expanded node of a navigational tree of a navigational display of an enterprise control and monitoring system.

In FIG. 28, three data log points are displayed: space temperature, outside temperature, and heat stage. As can be seen from the graph, the space temperature increases when the heat stage is on.

As shown in FIGS. 26-28, the data log points may be exported by selecting the export button.

Any data log points from any controllers in the navigation tree 1300 may be graphed alongside each other. Specifically, data log points from controllers in different sites may be graphed together and compared. For example, if a particular retailer is experiencing increased power consumption during a particular time of day, across all retail locations, the retailer may graph the appropriate power consumption data log points for all retail locations for the desired time of day. The data points for the controllers 104 across all directories, sites 130, and control systems 128 selected are displayed together.

Referring again to FIG. 9, the user may make a configuration selection and configure system, users, groups, directories, sites, etc., in step 916. The configuration options available may depend on the current user login and access privileges.

Figure 29:
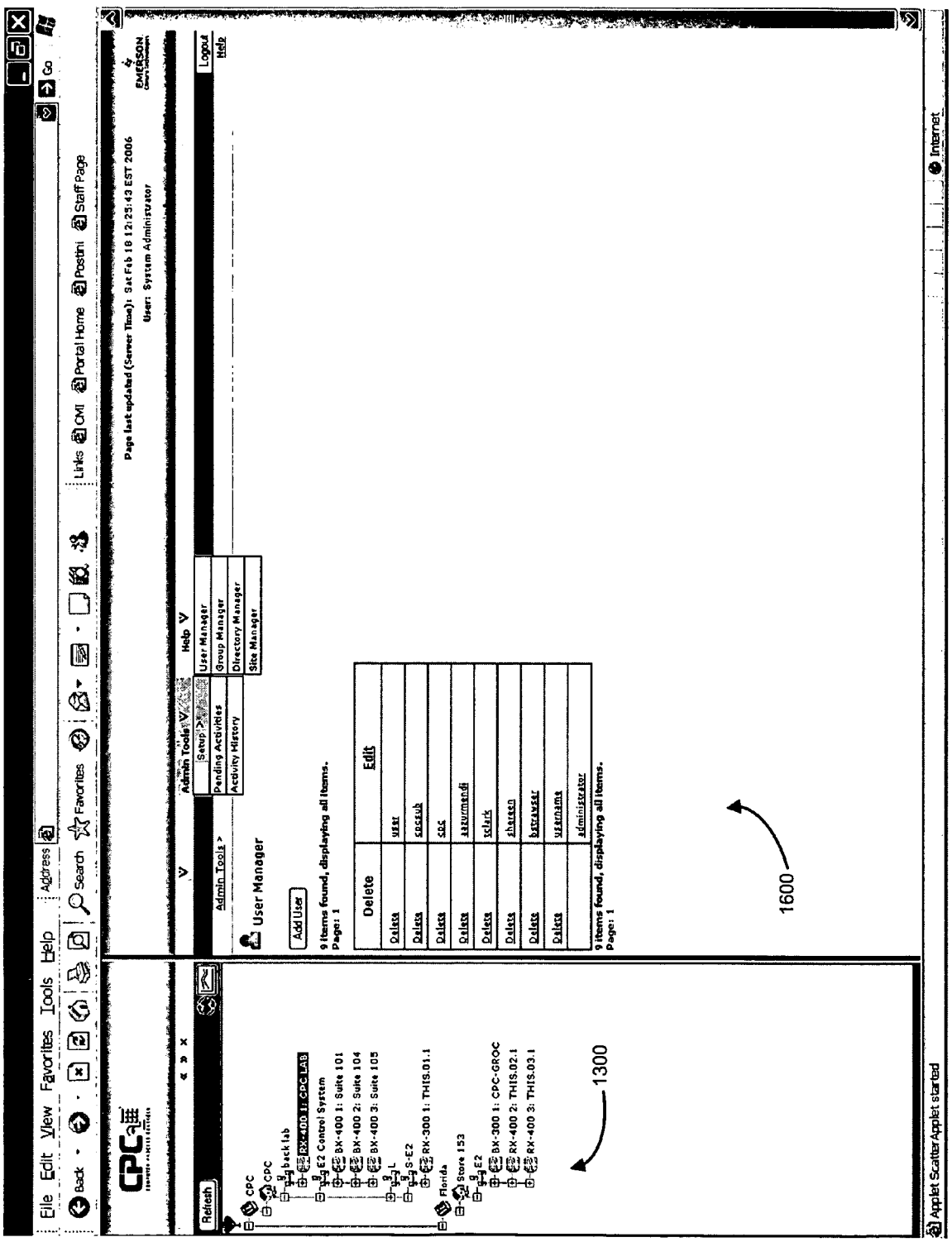
FIG. 29 is a screen shot of a user manager display of an enterprise control and monitoring system.

In FIG. 29, a user manager configuration screen is shown. The user profiles may be edited, and user access privileges may be modified.

Figure 30:
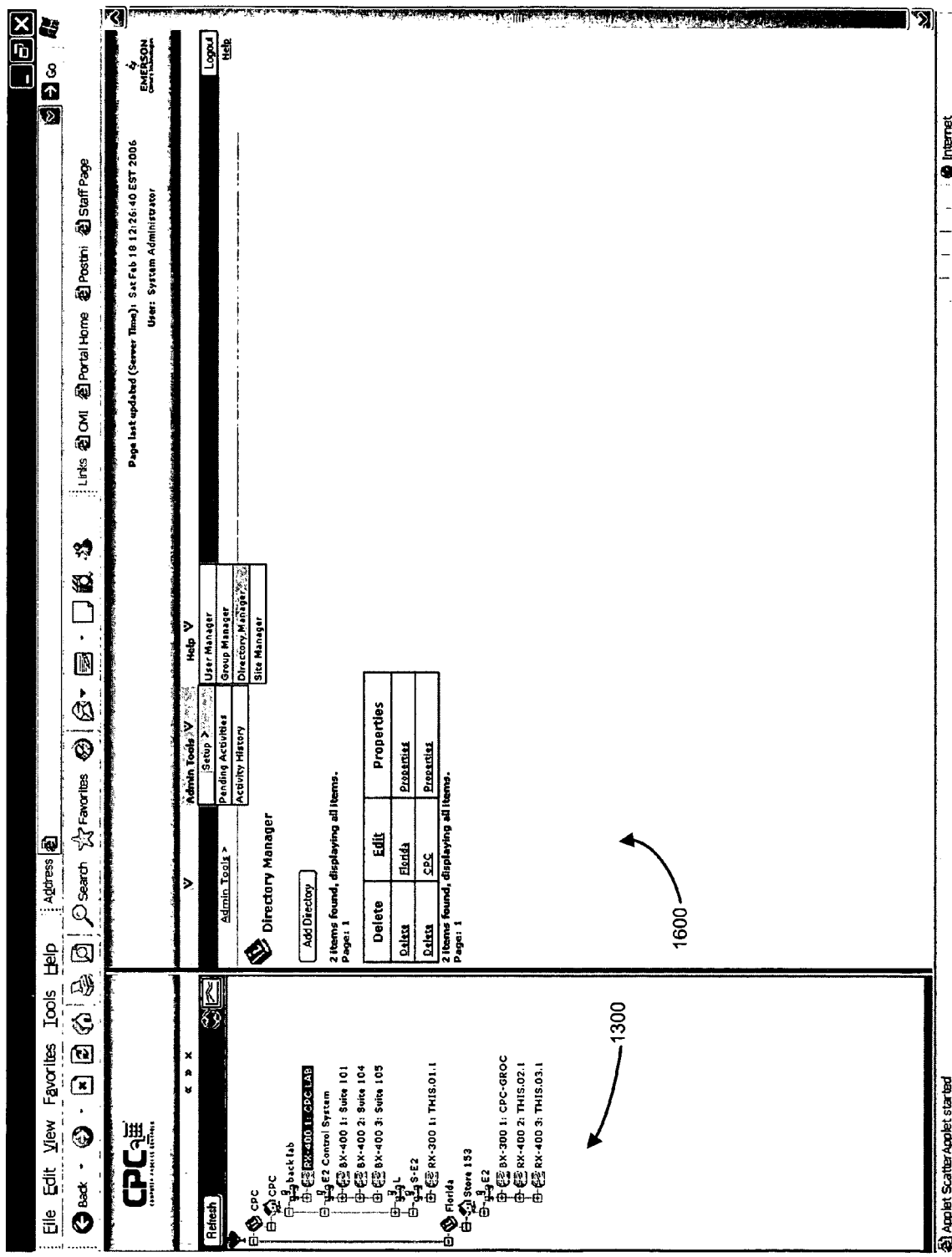
FIG. 30 is a screen shot of a directory manager display of an enterprise control and monitoring system.

In FIG. 30, a directory manager configuration screen is shown. Directories may be added, deleted, or edited.

Figure 31:
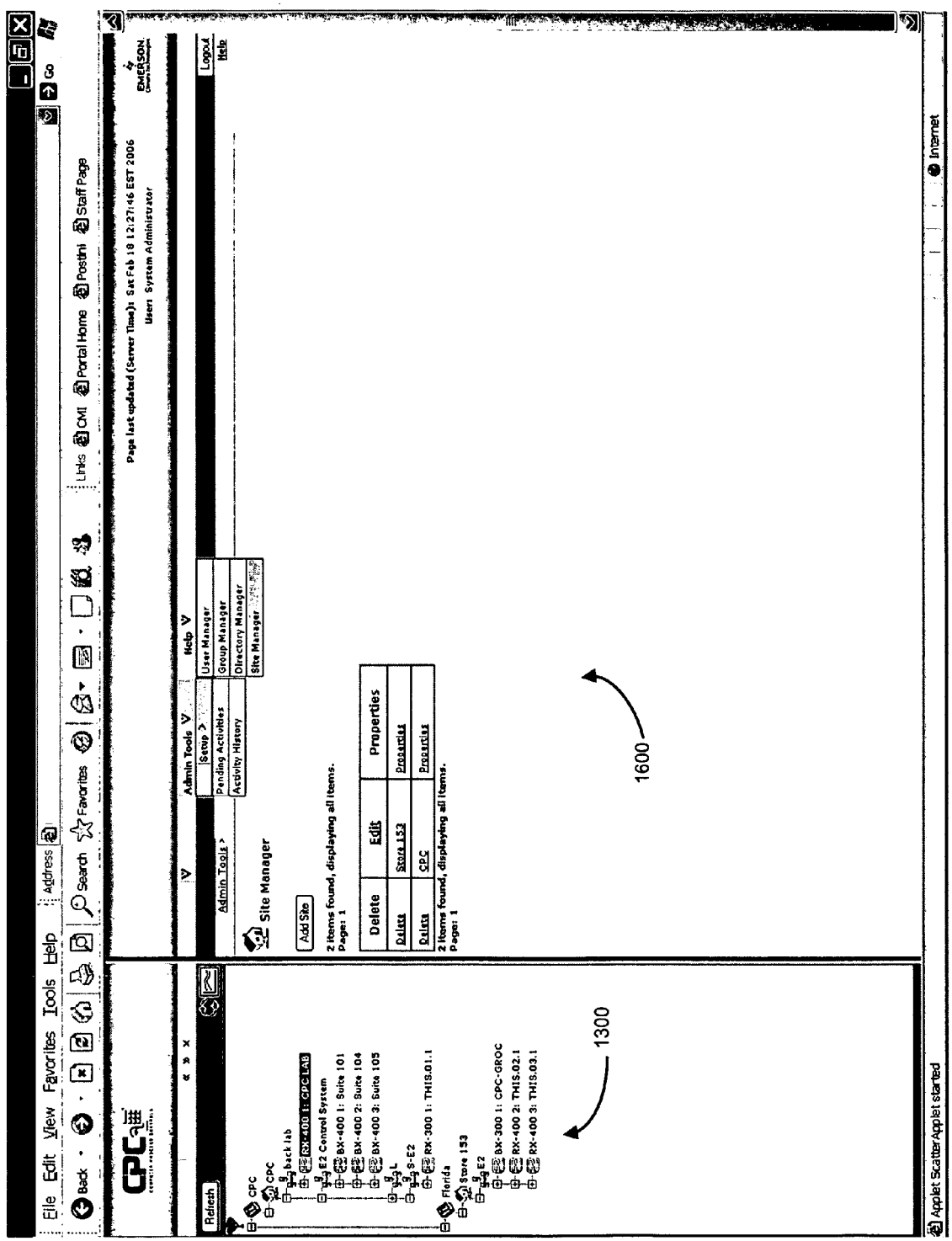
FIG. 31 is a screen shot of a site manager display of an enterprise control and monitoring system.

In FIG. 31, a site manager configuration screen is shown. Sites may be added, deleted, or edited.

Figure 32:
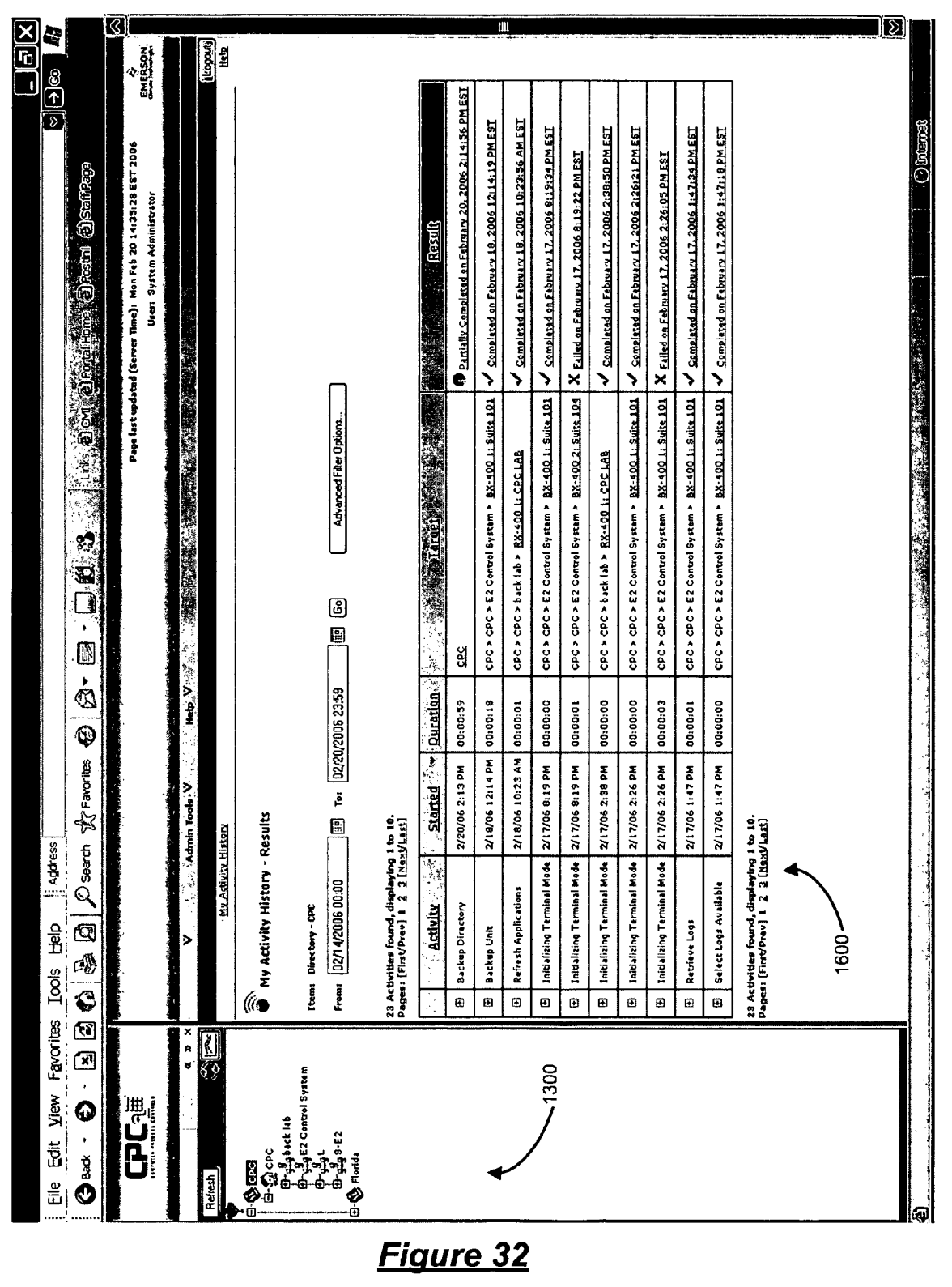

In FIG. 32, an activity history report is shown. The history of performed activities is displayed, along with activity results. The activity may be "Completed", "Failed", or "Partially Completed." When an activity is partially completed, the activity history may be navigated to determine the portion of the activity that was not completed.

Figure 33:
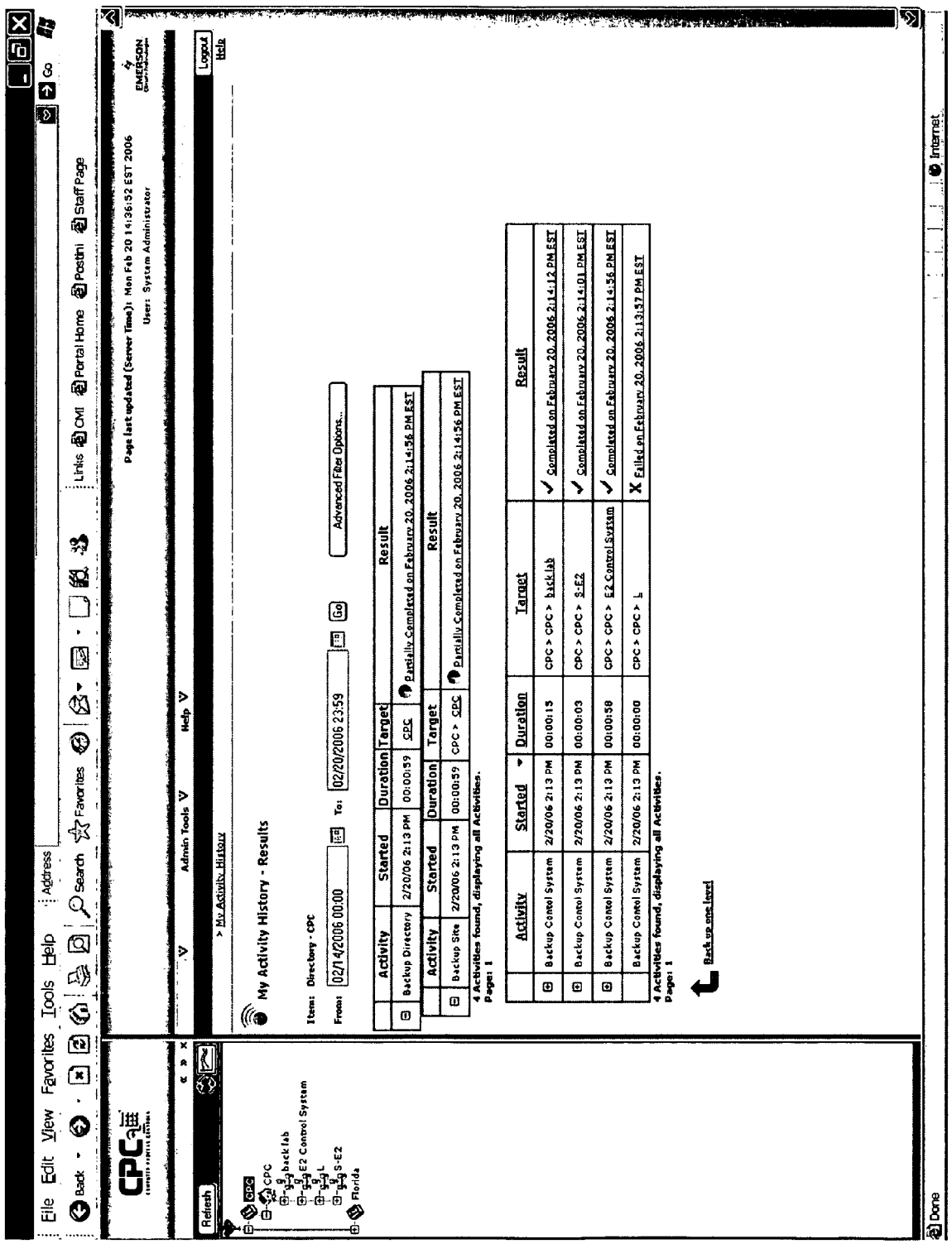
FIG. 33 is a screen shot of an expanded activity history of an enterprise control and monitoring system.

Referring now to FIG. 33, a "Backup Directory" activity is shown as partially completed. Expanding the activity reveals that the backup directory activity included a backup site activity, which also shows as partially completed. Expanding the backup site activity reveals that the activity included four control system backups. Reviewing the control system backups reveals that the first three control system backups were completed successfully, while the fourth control system backup for the "L" control system failed. Based on the activity history, the user may then investigate further to determine the cause of the activity failure.

Activities may be configured as well. Specifically, activities may be scheduled to occur on a recurring basis. For example, backup activities may be scheduled and may be staggered.

In addition, activities may occur automatically in response to an event. For example, controllers may generate alarm notifications. A controller 104 may generate an alarm notification to alert of a high or low pressure or temperature, of a system malfunction, of a maintenance requirement, etc. The server 102 may receive the alarm notification and perform a specified activity in response to the alarm. When a malfunction occurs, the server 102 may backup and retrieve all logs from the controller 104 associated with the malfunction. In this way, the data may be later analyzed to determine the cause of the malfunction.

To be compatible with the enterprise control and monitoring system software, the individual controllers 104 are configured with a number of high-level commands. The software may then communicate with the controllers 104 via the high-level commands. In this way, a communication protocol is established such that any controller 104 configured to communicate via the high-level commands may be used with the enterprise control and monitoring system software.

The high-level commands include: backup controller, restore controller, controller inventory, controller log-points. In addition, each high-level command may have a corresponding high-level command that is used to determine whether a particular controller 104 can perform the associated high-level command. For example, a high-level command may be used to determine whether a controller 104 can perform a backup, or a restore, etc. The backup and restore commands correspond to the backup and restore activities described above. The controller inventory command requests the controller 104 to provide a listing of all applications and data. The controller log-points command requests the controller to provide all of the log data points.

All communication access to the individual controllers 104 is controlled by the server 102. When multiple users access the same controller 104, the server 102 shares the controller connection between the two requesting users. The two users may perform different activities on the same controller 104 simultaneously. For example, a first user may graph desired log data points associated with the controller while the second user accesses a terminal mode associated with the controller 104. In this way, resource conflicts between multiple users are managed by the server which shares access to the controllers 104 between users as needed.

What is claimed is:

1. A method comprising:
grouping a plurality of building system controllers into at least one group, each of said building system controllers controlling a corresponding building system based on a closing time operating parameter, said grouping being performed by a server that is in communication with each of said building system controllers, wherein said closing time operating parameter indicates a time of day when each of the building system controllers performs a corresponding set of operations on the corresponding building system;
receiving input with said server indicating a modification of said closing time operating parameter;
receiving input with said server indicating a selected group of building system controllers from said at least one group of building system controllers;
sending said modification of said closing time operating parameter to each building system controller in said selected group of building system controllers, said sending being performed by said server.

2. The method of claim 1, wherein said grouping is performed such that each group of said at least one group includes building system controllers that are communicatively connected to each other.

3. The method of claim 1, wherein said grouping is performed such that each group of said at least one group includes building system controllers that are located at the same site.

4. The method of claim 1, wherein said grouping is performed such that each group of said at least one group includes building system controllers that are at least one of communicatively connected to each other or located at the same site.

5. The method of claim 1, wherein said plurality of building system controllers includes a building system controller for an HVAC system that is configured to decrease a heating set point temperature for said HVAC system at a time of day corresponding to said closing time operating parameter.

6. The method of claim 1, wherein said plurality of building system controllers includes a building system controller for an HVAC system that is configured to increase a cooling set point temperature for said HVAC system at a time of day corresponding to said closing time operating parameter.

7. The method of claim 1, wherein said plurality of building system controllers includes a building system controller for a lighting system that is configured to turn off at least one light of said lighting system at a time of day corresponding to said closing time operating parameter.

8. The method of claim 1, wherein said receiving said input indicating said modification of said closing time operating parameter and said receiving said input indicating said selected group includes receiving input data from a client located remotely from said server.

9. A system comprising:
a plurality of building system controllers, each building system controller of said plurality controlling a corresponding building system based on a closing time operating parameter;
a server in communication with each of said building system controllers, said server being operable to group said building system controllers into at least one group, wherein said closing time operating parameter indicates a time of day when each of the building system controllers performs a corresponding set of operations on the corresponding building system, to receive input indicating a modification of said closing time operating parameter, to receive input indicating a selected group of building system controllers from said at least one group of building system controllers, and to send said modification of said closing time operating parameter to each building system controller in said selected group of building system controllers.

10. The system of claim 9, wherein said at least one group includes building system controllers that are communicatively connected to each other.

11. The system of claim 9, wherein said at least one group includes building system controllers that are located at the same site.

12. The system of claim 9, wherein each group of said at least one group includes building system controllers that are at least one of communicatively connected to each other or located at the same site.

13. The system of claim 9, wherein said plurality of building system controllers includes a building system controller for an HVAC system that is configured to decrease a heating set point temperature for said HVAC system at a time of day corresponding to said closing time operating parameter.

14. The system of claim 9, wherein said plurality of building system controllers includes a building system controller for an HVAC system that is configured to increase a cooling set point temperature for said HVAC system at a time of day corresponding to said closing time operating parameter.

15. The system of claim 9, wherein said plurality of building system controllers includes a building system controller for a lighting system that is configured to turn off at least one light of said lighting system at a time of day corresponding to said closing time operating parameter.

16. The system of claim 9 further comprising a client located remotely from said server, wherein said server is configured to receive from said client said input indicating said modification of said closing time operating parameter and said input indicating said selected group of building controllers from said at least one group of building system controllers.

* * * * *

UNITED STATES PATENT AND TRADEMARK OFFICE
CERTIFICATE OF CORRECTION

PATENT NO. : 7,885,961 B2  
APPLICATION NO. : 11/394380  
DATED : February 8, 2011  
INVENTOR(S) : Stephen A. Horowitz et al.

Page 1 of 1

It is certified that error appears in the above-identified patent and that said Letters Patent is hereby corrected as shown below:

| | |
|---|---|
| Column 1, Line 57 | After "the", delete "for". |
| Column 5, Line 60 | After "portions", insert --of--. |
| Column 6, Line 35 | After "client", insert --software--. |
| Column 8, Line 62 | "controllers 1904" should be --controllers 104--. |

Signed and Sealed this  
Ninth Day of August, 2011

David J. Kappos  
*Director of the United States Patent and Trademark Office*